(12) United States Patent
Zwicky et al.

(10) Patent No.: US 8,832,055 B1
(45) Date of Patent: Sep. 9, 2014

(54) AUTO-REFINEMENT OF SEARCH RESULTS BASED ON MONITORED SEARCH ACTIVITIES OF USERS

(75) Inventors: Richard Kazimierz Zwicky, Victoria (CA); Todd William Hooge, Victoria (CA); Matthew Dunn, Bellingham, WA (US)

(73) Assignee: Gere Dev. Applications, LLC, Wilmington, DE (US)

( * ) Notice: Subject to any disclaimer, the term of this patent is extended or adjusted under 35 U.S.C. 154(b) by 1307 days.

(21) Appl. No.: 11/454,628

(22) Filed: Jun. 16, 2006

Related U.S. Application Data

(60) Provisional application No. 60/690,914, filed on Jun. 16, 2005, provisional application No. 60/703,901, filed on Aug. 1, 2005, provisional application No. 60/731,243, filed on Oct. 31, 2005.

(51) Int. Cl.
*G06F 17/30* (2006.01)

(52) U.S. Cl.
USPC .......................................... 707/706; 707/728

(58) Field of Classification Search
USPC .................................. 707/706, 728
See application file for complete search history.

(56) References Cited

U.S. PATENT DOCUMENTS

| | | | |
|---|---|---|---|
| 5,913,214 A | 6/1999 | Madnick et al. | |
| 6,006,260 A | 12/1999 | Barrick, Jr. et al. | |
| 6,363,377 B1 | 3/2002 | Kravets et al. | |
| 6,421,675 B1 | 7/2002 | Ryan et al. | |
| 6,449,590 B1 | 9/2002 | Gao | |
| 6,757,692 B1 | 6/2004 | Davis et al. | |
| 6,873,982 B1 | 3/2005 | Bates et al. | |
| 6,877,007 B1 | 4/2005 | Hentzel et al. | |
| 6,920,448 B2 | 7/2005 | Kincaid et al. | |
| 7,206,780 B2 * | 4/2007 | Slackman ........................ 707/7 |
| 7,383,334 B2 | 6/2008 | Wong et al. | |
| 7,620,628 B2 | 11/2009 | Kapur et al. | |
| 7,685,191 B1 | 3/2010 | Zwicky et al. | |
| 7,698,331 B2 | 4/2010 | Carson et al. | |
| 7,844,590 B1 | 11/2010 | Zwicky et al. | |
| 7,979,544 B2 | 7/2011 | Cancel et al. | |
| 7,987,170 B2 | 7/2011 | Hirst | |

(Continued)

OTHER PUBLICATIONS

Thorsten Joachims; *Optimizing Search Engines using Clickthrough Data*, Proceedings of the ACM Conference on Knowledge Discovery and Data Mining, Association for Computing Machinery (2002).

(Continued)

*Primary Examiner* — Kim Nguyen
(74) *Attorney, Agent, or Firm* — Christensen O'Connor Johnson Kindness PLLC

(57) ABSTRACT

A tracking system passively tracks and records searches conducted by actual search engine users. The recorded data for each search event preferably includes the search query submitted, the search engine used, the search result item (e.g., web page) selected, the position (e.g., page number) of this item, and the user's IP address. The collected data is aggregated and analyzed to generate data regarding the search queries used to locate and access particular destinations (e.g., web pages and sites). This data may be used for various purposes, such as (1) to generate reports showing, e.g., how users reach a particular destination from different search engines and geographic locations, (2) to select content to display on a destination page, such that the content is relevant to search queries commonly used to locate that page, and (3) to update the database of one search engine to reflect searches conducted on other search engines.

20 Claims, 64 Drawing Sheets

(56) References Cited

U.S. PATENT DOCUMENTS

| | | |
|---|---|---|
| 8,312,002 B2 | 11/2012 | Zwicky et al. |
| 8,468,048 B2 | 6/2013 | Agarwal et al. |
| 2002/0082923 A1 | 6/2002 | Merriman et al. |
| 2002/0126135 A1 | 9/2002 | Ball et al. |
| 2002/0169760 A1 | 11/2002 | Cheung et al. |
| 2002/0178180 A1 | 11/2002 | Kolosova et al. |
| 2003/0046281 A1 | 3/2003 | Son |
| 2003/0208578 A1 | 11/2003 | Taraborelli et al. |
| 2004/0068460 A1 | 4/2004 | Feeley et al. |
| 2004/0267806 A1 | 12/2004 | Lester |
| 2005/0033771 A1 | 2/2005 | Schmitter et al. |
| 2005/0076097 A1 | 4/2005 | Sullivan et al. |
| 2005/0102282 A1 | 5/2005 | Linden |
| 2005/0137939 A1 | 6/2005 | Calabria et al. |
| 2005/0222901 A1 | 10/2005 | Agarwal et al. |
| 2005/0222987 A1 | 10/2005 | Vadon |
| 2005/0240580 A1 | 10/2005 | Zamir et al. |
| 2005/0267872 A1 | 12/2005 | Galai et al. |
| 2005/0289120 A9 | 12/2005 | Soulanille et al. |
| 2006/0031206 A1* | 2/2006 | Deubel et al. ............ 707/3 |
| 2006/0074883 A1 | 4/2006 | Teevan et al. |
| 2006/0112081 A1 | 5/2006 | Qureshi |
| 2006/0149710 A1 | 7/2006 | Koningstein et al. |
| 2006/0161520 A1 | 7/2006 | Brewer et al. |
| 2006/0161534 A1 | 7/2006 | Carson, Jr. et al. |
| 2006/0161537 A1 | 7/2006 | Amitay et al. |
| 2006/0161541 A1 | 7/2006 | Cencini |
| 2006/0161542 A1 | 7/2006 | Cucerzan et al. |
| 2006/0161591 A1 | 7/2006 | Huang et al. |
| 2006/0161843 A1 | 7/2006 | Ebrahimi et al. |
| 2006/0167852 A1 | 7/2006 | Dissett et al. |
| 2006/0167854 A1 | 7/2006 | Dissett et al. |
| 2006/0167857 A1 | 7/2006 | Kraft et al. |
| 2006/0167874 A1 | 7/2006 | von Ahn Arellano et al. |
| 2006/0167896 A1 | 7/2006 | Kapur et al. |
| 2006/0168056 A1 | 7/2006 | Gandhi et al. |
| 2006/0200455 A1* | 9/2006 | Wilson ..................... 707/4 |
| 2006/0265435 A1* | 11/2006 | Denissov ................ 707/204 |
| 2007/0100962 A1* | 5/2007 | Barth et al. ............. 709/217 |
| 2007/0130131 A1* | 6/2007 | Porter et al. ............. 707/3 |
| 2007/0220000 A1 | 9/2007 | Walsh |
| 2008/0177859 A1 | 7/2008 | Nickerson |
| 2009/0006358 A1 | 1/2009 | Morris et al. |
| 2009/0100021 A1 | 4/2009 | Morris et al. |
| 2009/0248661 A1 | 10/2009 | Bilenko et al. |
| 2012/0030191 A1 | 2/2012 | Zwicky et al. |
| 2012/0036119 A1 | 2/2012 | Zwicky et al. |
| 2012/0089398 A1 | 4/2012 | Elbaz et al. |

OTHER PUBLICATIONS

Filip Radlinski & Thorsten Joachims; *Query Chains: Learning to Rank from Implicit Feedback*, Proceedings of the ACM Conference on Knowledge Discovery and Data Mining, Association for Computing Machinery (2005).

*New Search Patent Applications: Aug. 1, 2006—Microsoft Answers?*; [online] [retrieved on Aug. 21, 2006] Retrieved from the Internet: <URL: http://blog.searchenginewatch.com/blog/060801-232103>.

USPTO; Office Action dated May 29, 2008, from related U.S. Appl. No. 11/454,298 (filed Jun. 16, 2006).

USPTO; Office Action dated May 2, 2008, from related U.S. Appl. No. 11/454,305 (filed Jun. 16, 2006).

USPTO; Office Action dated May 30, 2008, from related U.S. Appl. No. 11/454,299 (filed Jun. 16, 2006).

USPTO; Office Action dated Nov. 14, 2008, from related U.S. Appl. No. 11/454,305 (filed Jun. 16, 2006).

USPTO; Office Action dated Dec. 5, 2008, from related U.S. Appl. No. 11/454,298 (filed Jun. 16, 2006).

USPTO; Office Action dated Dec. 5, 2008, from related U.S. Appl. No. 11/454,299 (filed Jun. 16, 2006).

USPTO; Office Communication Concerning a Requirement for Information, dated Jun. 1, 2009, from related U.S. Appl. No. 11/454,298 (filed Jun. 16, 2006).

USPTO; Office Action dated Jun. 1, 2009, from related U.S. Appl. No. 11/454,299 (filed Jun. 16, 2006).

USPTO; Office Action dated Jun. 11, 2009, from related U.S. Appl. No. 11/454,305 (filed Jun. 16, 2006).

USPTO; Office Action dated Jan. 26, 2010, from related U.S. Appl. No. 11/454,305 (filed Jun. 16, 2006).

USPTO; Office Action dated Sep. 3, 2010, from related U.S. Appl. No. 12/716,942 (filed Mar. 3, 2010).

U.S. Appl. No. 11/454,305: Final office action dated Jan. 26, 2010, 17 pages.

U.S. Appl. No. 11/454,305: Notice of Allowance dated Jan. 15, 2014, 7 pages.

* cited by examiner

Search Engine Comparison Report

Compare by: [Phrase ▼] [Compare]

| February 2006 | > |
|---|---|
| Mo Tu We Th Fr Sa Su |
| W 30 31 1 2 3 4 5 |
| W 6 7 8 9 10 11 12 |
| W 13 14 15 16 17 18 19 |
| W 20 21 22 23 24 25 26 |
| W 27 28 1 2 3 4 5 |
| W 6 7 8 9 10 11 12 |

Click on a linked date to select referrals for that date, or click on a "W" beside a week to select referrals for that week, or click on the month name to select referrals for the entire month.

Top 100 Phrases from Google for February 2006 — 202

| # | Phrase | H | L | A | K | #¢ | % |
|---|---|---|---|---|---|---|---|
| 1 | oracle layoffs | 1 | 2 | 1.0 | 1 | 923 | 5.0 |
| 2 | should i put these pictures of us on myspace or facebook? | 1 | 1 | 1.0 | 1 | 572 | 3.1 |
| 3 | oracle layoff | 1 | 3 | 1.0 | 1 | 567 | 3.1 |
| 4 | AIM virus | 1 | 2 | 1.1 | 1 | 439 | 2.4 |
| 5 | proxy search | 1 | 1 | 1.0 | 1 | 410 | 2.2 |
| 6 | myspace aim virus | 1 | 1 | 1.0 | 1 | 259 | 1.4 |
| 7 | long range wifi | 1 | 1 | 1.0 | 1 | 165 | 0.9 |
| 8 | aim myspace virus | 1 | 1 | 1.0 | 1 | 164 | 0.9 |
| 9 | wendy's menu | 1 | 3 | 1.3 | 2 | 133 | 0.7 |
| 10 | myspace virus | 1 | 1 | 1.0 | 1 | 129 | 0.7 |
| 11 | should i put these pictures of us on myspace or facebook | 1 | 1 | 1.0 | 1 | 121 | 0.7 |
| 12 | "should i put these pictures of us on myspace or facebook?" | 1 | 1 | 1.0 | 1 | 120 | 0.7 |
| 13 | proxy search engine | 1 | 1 | 1.0 | 1 | 111 | 0.6 |
| 14 | proxy search engines | 1 | 2 | 1.0 | 1 | 111 | 0.6 |

FIG. 2A

Top 100 Phrases from Yahoo! for February 2006 — 204

| # | Phrase | H | L | A | K | #Δ | % |
|---|---|---|---|---|---|---|---|
| 1 | myspace aim virus fix | 1 | 1 | 1.0 | 1 | 296 | 7.7 |
| 2 | oracle layoffs | 1 | 1 | 1.0 | 1 | 203 | 5.3 |
| 3 | myspace virus | 1 | 1 | 1.0 | 1 | 192 | 5.0 |
| 4 | oracle layoff | 1 | 1 | 1.0 | 1 | 78 | 2.0 |
| 5 | WENDYS MENU | 1 | 1 | 1.0 | 1 | 68 | 1.8 |
| 6 | aim virus fix | 1 | 1 | 1.0 | 1 | 60 | 1.6 |
| 7 | wendys | 1 | 1 | 1.0 | 1 | 54 | 1.4 |
| 8 | captain morgan | 1 | 1 | 1.0 | 1 | 46 | 1.2 |
| 9 | www.discoverchannel.com | 1 | 1 | 1.0 | 1 | 46 | 1.2 |
| 10 | proxy search | 1 | 1 | 1.0 | 1 | 42 | 1.1 |
| 11 | aim virus | 1 | 3 | 1.1 | 1 | 41 | 1.1 |
| 12 | spying | 1 | 1 | 1.0 | 1 | 39 | 1.0 |
| 13 | farting preacher 5 | 1 | 1 | 1.0 | 1 | 38 | 1.0 |
| 14 | mobile gas card | 1 | 1 | 1.0 | 1 | 36 | 0.9 |
| 15 | should i put these picture of us on myspace or facebook? | 1 | 1 | 1.0 | 1 | 36 | 0.9 |

FIG. 2B gcaws | Home | Summary | Signout

Top 100 Phrases from MSN for February 2006 — 206

| # | Phrase | H | L | A | K | #⇧ | % |
|---|---|---|---|---|---|---|---|
| 1 | Exxon Mobile | 1 | 1 | 1.0 | 1 | 135 | 5.0 |
| 2 | msn account | 1 | 5 | 1.1 | 1 | 52 | 2.7 |
| 3 | MYSPACE VIRUS | 1 | 1 | 1.0 | 1 | 48 | 2.5 |
| 4 | international cxt | 1 | 1 | 1.0 | 1 | 41 | 2.1 |
| 5 | oracle layoffs | 1 | 1 | 1.0 | 1 | 41 | 2.1 |
| 6 | oracle layoff | 1 | 2 | 1.0 | 1 | 38 | 2.0 |
| 7 | make a new msn account | 1 | 1 | 1.0 | 1 | 34 | 1.7 |
| 8 | mobile gas | 1 | 2 | 1.2 | 1 | 26 | 1.3 |
| 9 | msn hack | 1 | 2 | 1.1 | 1 | 24 | 1.2 |
| 10 | aim virus | 1 | 1 | 1.0 | 1 | 20 | 1.0 |
| 11 | mobile speed pass | 1 | 1 | 1.0 | 1 | 19 | 1.0 |
| 12 | farting preacher | 2 | 3 | 2.7 | 3 | 18 | 0.9 |
| 13 | create new msn account | 1 | 1 | 1.0 | 1 | 15 | 0.8 |
| 14 | msn adcenter | 1 | 2 | 1.3 | 1 | 15 | 0.8 |
| 15 | exxon gas | 1 | 1 | 1.0 | 1 | 14 | 0.7 |
| 16 | new msn account | 1 | 5 | 1.6 | 1 | 14 | 0.7 |

FIG. 2C

| 15 | Biggest SUV | 1 | 4 | 1.0 | 1 | 105 | 0.7 |
|---|---|---|---|---|---|---|---|
| 16 | Wendy's menu | 1 | 1 | 1.0 | 1 | 97 | 0.5 |
| 17 | free proxy | 5 | 10 | 6.8 | 8 | 93 | 0.5 |
| 18 | aim virus myspace | 1 | 1 | 1.0 | 1 | 89 | 0.5 |
| 19 | myspace viruses | 1 | 1 | 1.0 | 1 | 85 | 0.5 |
| 20 | international suv | 1 | 1 | 1.0 | 1 | 83 | 0.5 |
| 21 | google acquisitions | 1 | 1 | 1.0 | 1 | 82 | 0.4 |
| 22 | farting preacher | 1 | 10 | 2.5 | 2 | 77 | 0.4 |
| 23 | nolifier | 1 | 1 | 1.0 | 1 | 70 | 0.4 |
| 24 | google phone | 1 | 2 | 1.0 | 1 | 67 | 0.4 |
| 25 | largest SUV | 1 | 1 | 1.0 | 1 | 63 | 0.3 |
| 26 | mobile speed pass | 1 | 1 | 1.0 | 1 | 63 | 0.3 |
| 27 | "should i put these pictures of us on myspace or facebook" | 1 | 1 | 1.0 | 1 | 61 | 0.3 |
| 28 | free proxies | 1 | 6 | 4.4 | 4 | 61 | 0.3 |
| 29 | farting preacher 1 | 1 | 2 | 1.5 | 2 | 57 | 0.3 |

*FIG. 2D*

| 16 | myspace aim virus | 1 | 1 | 1.0 | 1 | 34 | 0.9 |
|---|---|---|---|---|---|---|---|
| 17 | AIM virus myspace | 1 | 1 | 1.0 | 1 | 30 | 0.8 |
| 18 | aim myspace virus | 1 | 1 | 1.0 | 1 | 30 | 0.8 |
| 19 | international suv | 1 | 1 | 1.0 | 1 | 30 | 0.8 |
| 20 | DISCOVERCHANNEL.COM | 1 | 1 | 1.0 | 1 | 29 | 0.8 |
| 21 | mobile gas | 1 | 1 | 1.0 | 1 | 29 | 0.8 |
| 22 | happy birthday dad | 1 | 1 | 1.0 | 1 | 28 | 0.7 |
| 23 | branding strategy | 1 | 1 | 1.0 | 1 | 27 | 0.7 |
| 24 | biggest suv | 1 | 1 | 1.0 | 1 | 22 | 0.6 |
| 25 | find away around myspaceproxy | 1 | 1 | 1.0 | 1 | 20 | 0.5 |
| 26 | long range wifi | 1 | 1 | 1.0 | 1 | 19 | 0.5 |
| 27 | Brightcove | 1 | 1 | 1.0 | 1 | 17 | 0.4 |
| 28 | proxy search engine | 1 | 1 | 1.0 | 1 | 17 | 0.4 |
| 29 | myspace happy birthday comments | 1 | 1 | 1.0 | 1 | 16 | 0.4 |
| 30 | websourced | 1 | 2 | 1.1 | 1 | 15 | 0.4 |
| 31 | fix myspace | 1 | 1 | 1.0 | 1 | 14 | 0.4 |

FIG. 2E

| 17 | exxon/mobile | 1 | 1.0 | 1 | 13 | 0.7 |
| 18 | create a msn account | 1 | 1.0 | 1 | 11 | 0.6 |
| 19 | create an msn account | 1 | 1.0 | 1 | 11 | 0.6 |
| 20 | international suv | 1 | 1.0 | 1 | 11 | 0.6 |
| 21 | make a msn account | 1 | 1.0 | 1 | 11 | 0.6 |
| 22 | video seeks | 1 | 1.0 | 1 | 11 | 0.6 |
| 23 | Mobile gas station | 1 | 1.0 | 1 | 10 | 0.5 |
| 24 | create a new msn account | 1 | 1.0 | 1 | 10 | 0.5 |
| 25 | create msn account | 1 | 1.0 | 1 | 10 | 0.5 |
| 26 | make msn account | 1 | 1.0 | 1 | 10 | 0.5 |
| 27 | mobile gas card | 1 | 1.0 | 1 | 10 | 0.5 |
| 28 | w32.allim | 3 | 2.0 | 3 | 10 | 0.5 |
| 29 | exxon mobile card | 1 | 1.0 | 1 | 9 | 0.5 |
| 30 | get a new msn account | 1 | 1.0 | 1 | 9 | 0.5 |
| 31 | make an msn account | 1 | 1.0 | 1 | 9 | 0.5 |

FIG. 2F

| FIG. 9A-1 | FIG. 9A-2 |
|---|---|
| FIG. 9A-3 | FIG. 9A-4 |

*FIG. 9A*

File Edit View Favorites Tools Help

Search Engine Referrals ②

Browsing Referrals

For referrals logged February 2006
Where:
[X] Country = United States of America

| < | February 2006 | > |
|---|---|---|
| | Mo Tu We Th Fr Sa Su | |
| W | 30 31 1 2 3 4 5 | |
| W | 6 7 8 9 10 11 12 | |
| W | 13 14 15 16 17 18 19 | |
| W | 20 21 22 23 24 25 26 | |
| W | 27 28 1 2 3 4 5 | |
| W | 6 7 8 9 10 11 12 | |

Click on a linked date to select
referrals for that date, or click on
a "W" beside a week to select
referrals for that week, or click on
the month name to select referrals
for the entire month.

| Phrases | Search Engines | Locations | Regions | Cities | ZIP/Postal Codes |
|---|---|---|---|---|---|

| # | Phrases |
|---|---|
| 1 | [+] oracle layoffs |
| 2 | [+] should i put these pictures of us on myspace or facebook? |
| 3 | [+] oracle layoff |
| 4 | [+] AIM virus |
| 5 | [+] proxy search |
| 6 | [+] myspace virus |
| 7 | [+] myspace aim virus fix |
| 8 | [+] myspace aim virus |
| 9 | [+] wendys menu |

*FIG. 9B-1*

| | | |
|---|---|---|
| Remove constraints by clicking on the associated [X] link. | 10 | [+] AIM myspace virus |
| | 11 | [+] "should i put these pictures of us on myspace or facebook?" |
| You can add an item to the list of constraints by clicking on the associated [+] link. | 12 | [+] long rang wifi |
| | 13 | [+] should i put these pictures of us on myspace or facebook |
| If you click on a linked item, that item will replace any existing constraints and become the only constraint. | 14 | [+] exxon mobile |
| | 15 | [+] aim virus myspace |
| | 16 | [+] international suv |
| | 17 | [+] proxy search engine |
| | 18 | [+] Wendy's menu |
| | 19 | [+] proxy search engines |
| | 20 | [+] Biggest SUV |
| | 21 | [+] farting preacher |
| | 22 | [+] mobile speed pass |
| | 23 | [+] myspace viruses |
| | 24 | [+] free proxy |
| | 25 | [+] aim virux fix |
| | 26 | [+] mobile gas card |
| | 27 | [+] brightcove |
| | 28 | [+] "should i put these pictures of us on myspace or facebook" |

*FIG. 9B-3*

| Chart | 1 | 1.0 | 1 | 200 | 2.3 |
|---|---|---|---|---|---|
| Chart | 1 | 1.0 | 1 | 133 | 1.5 |
| Chart | 1 | 1.0 | 1 | 133 | 1.5 |
| Chart | 1 | 1.0 | 1 | 128 | 1.5 |
| Chart | 1 | 1.0 | 1 | 124 | 1.4 |
| Chart | 1 | 1.0 | 1 | 118 | 1.4 |
| Chart | 1 | 1.0 | 1 | 112 | 1.3 |
| Chart | 1 | 1.0 | 1 | 111 | 1.3 |
| Chart | 1 | 1.0 | 1 | 104 | 1.2 |
| Chart | 1 | 1.0 | 2 | 97 | 1.1 |
| Chart | 1 | 1.0 | 4 | 96 | 1.1 |
| Chart | 1 | 2.4 | 10 | 88 | 1.0 |
| Chart | 1 | 1.0 | 2 | 83 | 1.0 |
| Chart | 1 | 1.0 | 2 | 83 | 1.0 |
| Chart | 1 | 8.4 | 74 | 78 | 0.9 |
| Chart | 5 | 1.0 | 2 | 76 | 0.9 |
| Chart | 1 | 1.0 | 1 | 72 | 0.8 |
| Chart | 1 | 1.1 | 2 | 61 | 0.7 |
| Chart | 1 | 1.0 | 1 | 59 | 0.7 |

*FIG. 9B-4*

| FIG. 9C-1 | FIG. 9C-2 |
|---|---|
| FIG. 9C-3 | FIG. 9C-4 |

*FIG. 9C*

Search Engine Referrals ③

Browsing Referrals

For referrals logged February 2006
Where:
[X] Country = United States of America
[X] Phrase = oracle layoffs

| < | February 2006 | > |
|---|---|---|
| | Mo Tu We Th Fr Sa Su | |
| W | 30 31 1 2 3 4 5 | |
| W | 6 7 8 9 10 11 12 | |
| W | 13 14 15 16 17 18 19 | |
| W | 20 21 22 23 24 25 26 | |
| W | 27 28 1 2 3 4 5 | |
| W | 6 7 8 9 10 11 12 | |

Click on a linked date to select referrals for that date, or click on a "W" beside a week to select referrals for that week, or click on the month name to select referrals for the entire month.

| Search Engines | Locations | Regions | Cities | ZIP/Postal Codes |
|---|---|---|---|---|

| # | Search Engines |
|---|---|
| 1 | [+] Google |
| 2 | [+] Yahoo! |
| 3 | [+] MSN |
| 4 | [+] Dogpile |
| 5 | [+] Comcast |
| 6 | [+] Google-UK |
| 7 | [+] America Online |
| 8 | [+] Adelphia |
| 9 | [+] EarthLink |

*FIG. 9C-1*

| | | |
|---|---|---|
| Remove constraints by clicking on the associated [X] link. | 10 | [+] Google-AU |
| | 11 | [+] Google-CA |
| You can add an item to the list of constraints by clicking on the associated [+] link. | 12 | [+] Google-IN |
| | 13 | [+] Netscape |
| If you click on a linked item, that item will replace any existing constraints and become the only constraint. | 14 | [+] AT&T Worldnet |
| | 15 | [+] Google-NL |
| | 16 | [+] MyWay |
| | 17 | [+] Verizon |

*FIG. 9C-3*

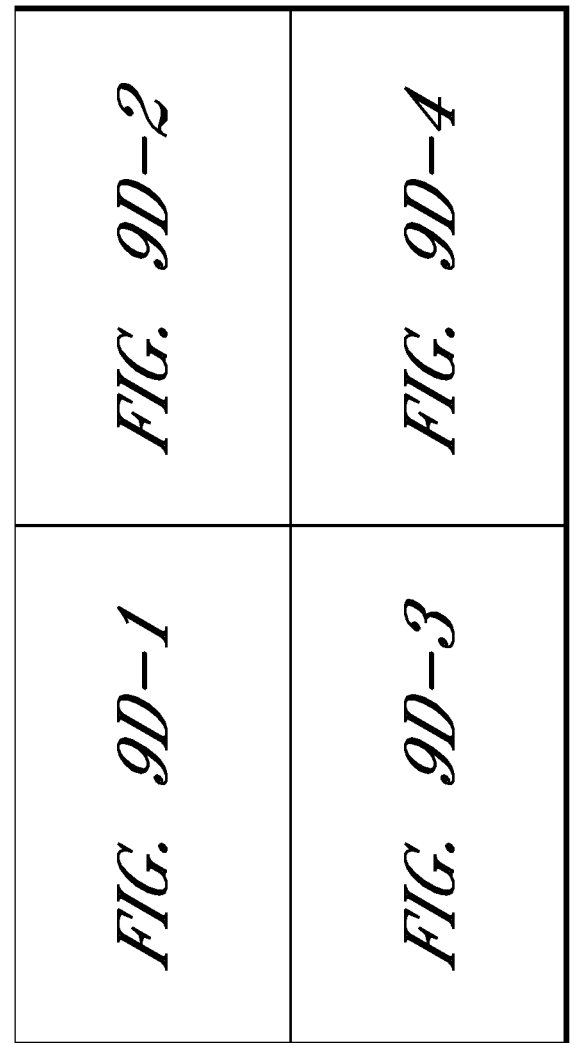

Search Engine Referrals
Browsing Referrals ④

For referrals logged February 2006
Where:
[X] Country = United States of America
[X] Phrase = oracle layoffs
[X] Engine = Google

| < | February 2006 | | | | | > |
|---|---|---|---|---|---|---|
| | Mo | Tu | We | Th | Fr | Sa | Su |
| W | 30 | 31 | 1 | 2 | 3 | 4 | 5 |
| W | 6 | 7 | 8 | 9 | 10 | 11 | 12 |
| W | 13 | 14 | 15 | 16 | 17 | 18 | 19 |
| W | 20 | 21 | 22 | 23 | 24 | 25 | 26 |
| W | 27 | 28 | 1 | 2 | 3 | 4 | 5 |
| W | 6 | 7 | 8 | 9 | 10 | 11 | 12 |

Click on a linked date to select referrals for that date, or click on a "W" beside a week to select referrals for that week, or click on the month name to select referrals for the entire month.

| Locations | Regions | Cities | ZIP/Postal Codes |
|---|---|---|---|
| # | Locations | | |
| 1 | [+] /2005/01/oracle-layoffs-confirmed.cfm | | |
| 2 | [+] /2005/01/oracle-laying-off-friends.cfm | | |
| 3 | [+] /2005/01/oracle-laying-off-friends.cfm (via Google cache) | | |
| 4 | [+] /2005/01/oracle-layoffs-confirmed.cfm (via Google cache) | | |

*FIG. 9D-1*

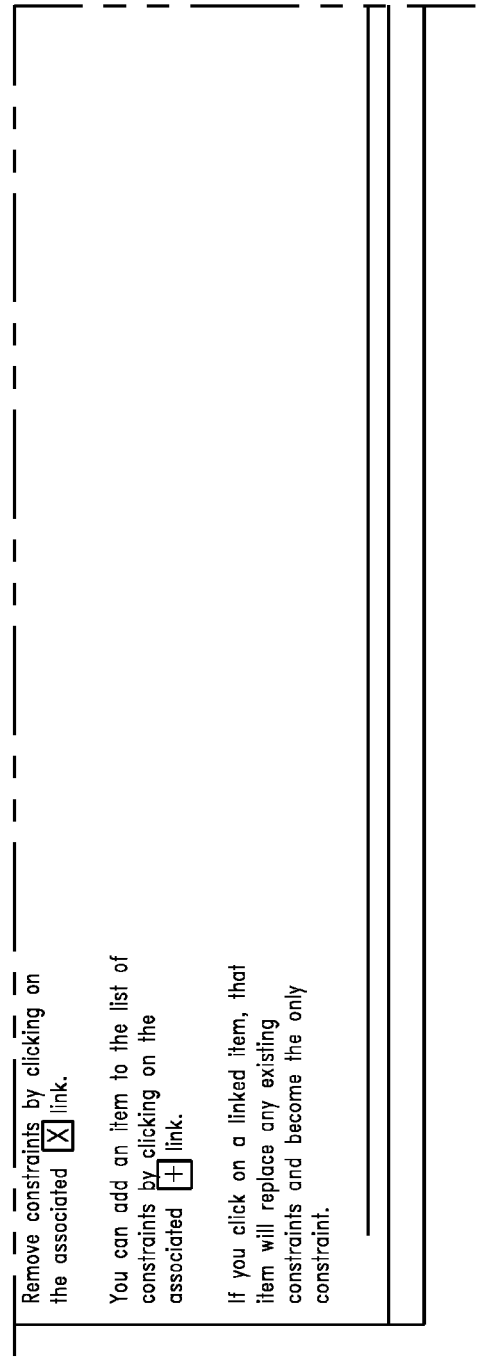

| FIG. 9E-1 | FIG. 9E-2 |

FIG. 9E

File  Edit  View  Favorites  Tools  Help

Search Engine Referrals  ⑤

Home|Summary|Signout

Browsing Referrals

For referrals logged February 2006
Where:
- [X] Country = United States of America
- [X] Phrase = oracle layoffs
- [X] Engine = Google
- [X] Location = /2005/01/oracle-layoffs-confirmed.cfm

| < | February 2006 | | | | | > |
|---|---|---|---|---|---|---|
| | Mo | Tu | We | Th | Fr | Sa | Su |
| W | 30 | 31 | 1 | 2 | 3 | 4 | 5 |
| W | 6 | 7 | 8 | 9 | 10 | 11 | 12 |
| W | 13 | 14 | 15 | 16 | 17 | 18 | 19 |
| W | 20 | 21 | 22 | 23 | 24 | 25 | 26 |
| W | 27 | 28 | 1 | 2 | 3 | 4 | 5 |
| W | 6 | 7 | 8 | 9 | 10 | 11 | 12 |

Click on a linked date to select referrals for that date, or click on a "W" beside a week to select referrals for that week, or click on the month name to select referrals for the entire month.

Page 1 of 1

| Regions | Cities | ZIP/Postal Codes |
|---|---|---|

| # | Regions | | H | L | A | K | # | % |
|---|---|---|---|---|---|---|---|---|
| 1 | [+] CA | Chart | 1 | 1 | 1.0 | 1 | 426 | 70.6 |
| 2 | [+] CO | Chart | 1 | 1 | 1.0 | 1 | 41 | 6.8 |
| 3 | [+] MA | Chart | 1 | 1 | 1.0 | 1 | 25 | 4.6 |
| 4 | [+] NJ | Chart | 1 | 1 | 1.0 | 1 | 14 | 2.3 |
| 5 | [+] NY | Chart | 1 | 1 | 1.0 | 1 | 11 | 1.8 |
| 6 | [+] IL | Chart | 1 | 1 | 1.0 | 1 | 7 | 1.2 |
| 7 | [+] TX | Chart | 1 | 1 | 1.0 | 1 | 7 | 1.2 |
| 8 | [+] WA | Chart | 1 | 1 | 1.0 | 1 | 6 | 1.0 |

*FIG. 9E-1*

| | | | | | | |
|---|---|---|---|---|---|---|
| Remove constraints by clicking on the associated [X] link. | 9 | [+] FL | Chart | 1 | 1 | 1.0 | 1 | 5 | 0.8 |
| | 10 | [+] GA | Chart | 1 | 1 | 1.0 | 1 | 5 | 0.8 |
| You can add an item to the list of constraints by clicking on the associated [+] link. | 11 | [+] MD | Chart | 1 | 1 | 1.0 | 1 | 5 | 0.8 |
| | 12 | [+] VA | Chart | 1 | 1 | 1.0 | 1 | 5 | 0.8 |
| If you click on a linked item, that item will replace any existing constraints and become the only constraint. | 13 | [+] AZ | Chart | 1 | 1 | 1.0 | 1 | 4 | 0.7 |
| | 14 | [+] MN | Chart | 1 | 1 | 1.0 | 1 | 4 | 0.7 |
| | 15 | [+] PA | Chart | 1 | 1 | 1.0 | 1 | 4 | 0.7 |
| | 16 | [+] NC | Chart | 1 | 1 | 1.0 | 1 | 3 | 0.5 |
| | 17 | [+] OR | Chart | 1 | 1 | 1.0 | 1 | 3 | 0.5 |
| | 18 | [+] Undefined | | | | | | | |
| | 19 | [+] IN | Chart | 1 | 1 | 1.0 | 1 | 2 | 0.3 |
| | 20 | [+] NH | Chart | 1 | 1 | 1.0 | 1 | 2 | 0.3 |
| | 21 | [+] OH | Chart | 1 | 1 | 1.0 | 1 | 2 | 0.3 |
| | 22 | [+] TN | Chart | 1 | 1 | 1.0 | 1 | 2 | 0.3 |
| | 23 | [+] VT | Chart | 1 | 1 | 1.0 | 1 | 2 | 0.3 |
| | 24 | [+] AE | Chart | 1 | 1 | 1.0 | 1 | 1 | 0.2 |
| | 25 | [+] AL | Chart | 1 | 1 | 1.0 | 1 | 1 | 0.2 |
| | 26 | [+] CT | Chart | 1 | 1 | 1.0 | 1 | 1 | 0.2 |

Search Engine Referrals

Browsing Referrals

For referrals logged February 2006
Where:
- [X] Country = United States of America
- [X] Phrase = oracle layoffs
- [X] Engine = Google
- [X] Location = /2005/01/oracle-layoffs-confirmed.cfm
- [X] Region = CA

| February 2006 | | | | | | |
|---|---|---|---|---|---|---|
| < | | | | | | > |
| Mo | Tu | We | Th | Fr | Sa | Su |
| W 30 | 31 | 1 | 2 | 3 | 4 | 5 |
| W 6 | 7 | 8 | 9 | 10 | 11 | 12 |
| W 13 | 14 | 15 | 16 | 17 | 18 | 19 |
| W 20 | 21 | 22 | 23 | 24 | 25 | 26 |
| W 27 | 28 | 1 | 2 | 3 | 4 | 5 |
| W 6 | 7 | 8 | 9 | 10 | 11 | 12 |

Click on a linked date to select referrals for that date, or click on a "W" beside a week to select Home|Summary|Signout Page 1 of 1

| Cities | ZIP/Postal Codes | | | | | |
|---|---|---|---|---|---|---|
| # | Cities | H | L | A | K | # | % |
| 1 | ⊞ Redwood City | Chart | 1 | 1 | 1.0 | 1 | 188 | 44.1 |
| 2 | ⊞ San Francisco | Chart | 1 | 1 | 1.0 | 1 | 22 | 5.2 |
| 3 | ⊞ San Mateo | Chart | 1 | 1 | 1.0 | 1 | 22 | 5.2 |
| 4 | ⊞ Hayward | Chart | 1 | 1 | 1.0 | 1 | 17 | 4.0 |
| 5 | ⊞ Oakland | Chart | 1 | 1 | 1.0 | 1 | 16 | 3.8 |
| 6 | ⊞ Pleasanton | Chart | 1 | 1 | 1.0 | 1 | 14 | 3.3 |

FIG. 9F-1

| | | referrals for that week, or click on the month name to select referrals for the entire month. Remove constraints by clicking on the associated ☒ link. You can add an item to the list of constraints by clicking on the associated ⊞ link. If you click on a linked item, that item will replace any existing constraints and become the only constraint. | | | | | | ▶ |
|---|---|---|---|---|---|---|---|---|
| 7 | ⊞ | San Leandro | Chart | 1 | 1 | 1.0 | 1 | 14 | 3.3 |
| 8 | ⊞ | Castro Valley | Chart | 1 | 1 | 1.0 | 1 | 12 | 2.8 |
| 9 | ⊞ | Fremont | Chart | 1 | 1 | 1.0 | 1 | 12 | 2.8 |
| 10 | ⊞ | Santa Clara | Chart | 1 | 1 | 1.0 | 1 | 11 | 2.6 |
| 11 | ⊞ | San Jose | Chart | 1 | 1 | 1.0 | 1 | 8 | 1.9 |
| 12 | ⊞ | Sunnyvale | Chart | 1 | 1 | 1.0 | 1 | 7 | 1.6 |
| 13 | ⊞ | Mountain View | Chart | 1 | 1 | 1.0 | 1 | 6 | 1.4 |
| 14 | ⊞ | Livermore | Chart | 1 | 1 | 1.0 | 1 | 5 | 1.2 |
| 15 | ⊞ | Sacramento | Chart | 1 | 1 | 1.0 | 1 | 5 | 1.2 |
| 16 | ⊞ | San Ramon | Chart | 1 | 1 | 1.0 | 1 | 5 | 1.2 |
| 17 | ⊞ | Alviso | Chart | 1 | 1 | 1.0 | 1 | 4 | 0.9 |
| 18 | ⊞ | Berkeley | Chart | 1 | 1 | 1.0 | 1 | 3 | 0.7 |
| 19 | ⊞ | Danville | Chart | 1 | 1 | 1.0 | 1 | 3 | 0.7 |
| 20 | ⊞ | Dublin | Chart | 1 | 1 | 1.0 | 1 | 3 | 0.7 |
| 21 | ⊞ | Palo Alto | Chart | 1 | 1 | 1.0 | 1 | 3 | 0.7 |
| 22 | ⊞ | Alameda | Chart | 1 | 1 | 1.0 | 1 | 2 | 0.5 |
| 23 | ⊞ | Antioch | Chart | 1 | 1 | 1.0 | 1 | 2 | 0.5 |
| 24 | ⊞ | Burlingame | Chart | 1 | 1 | 1.0 | 1 | 2 | 0.5 |
| 25 | ⊞ | Inverness | Chart | 1 | 1 | 1.0 | 1 | 2 | 0.5 |

*FIG. 9F-2*

| FIG. 9G-1 | FIG. 9G-2 |

FIG. 9G

File  Edit  View  Favorites  Tools  Help

Search Engine Referrals  ⑦

Browsing Referrals

For referrals logged February 2006
Where:
- [X] Country = United States of America
- [X] Phrase = oracle layoffs
- [X] Engine = Google
- [X] Location = /2005/01/oracle-layoffs-confirmed.cfm
- [X] Region = CA
- [X] City = Redwood City Home | Summary | Signout

| < | February 2006 | > |
|---|---|---|
| W | Mo Tu We Th Fr Sa Su |
| W | 30 31 1 2 3 4 5 |
| W | 6 7 8 9 10 11 12 |
| W | 13 14 15 16 17 18 19 |
| W | 20 21 22 23 24 25 26 |
| W | 27 28 1 2 3 4 5 |
| W | 6 7 8 9 10 11 12 |

ZIP/Postal Codes

Page 1 of 1

| # | Zip/Postal Codes | | H | L | A | K | # | % |
|---|---|---|---|---|---|---|---|---|
| 1 | 94065 | Chart | 1 | 1 | 1.0 | 1 | 182 | 96.8 |
| 2 | *Undefined* | Chart | 1 | 1 | 1.0 | 1 | 5 | 2.7 |
| 3 | 94063 | Chart | 1 | 1 | 1.0 | 1 | 1 | 0.5 |

*FIG. 9G-1*

| FIG. 10J-1 | FIG. 10J-2 | FIG. 10J-3 |

FIG. 10J

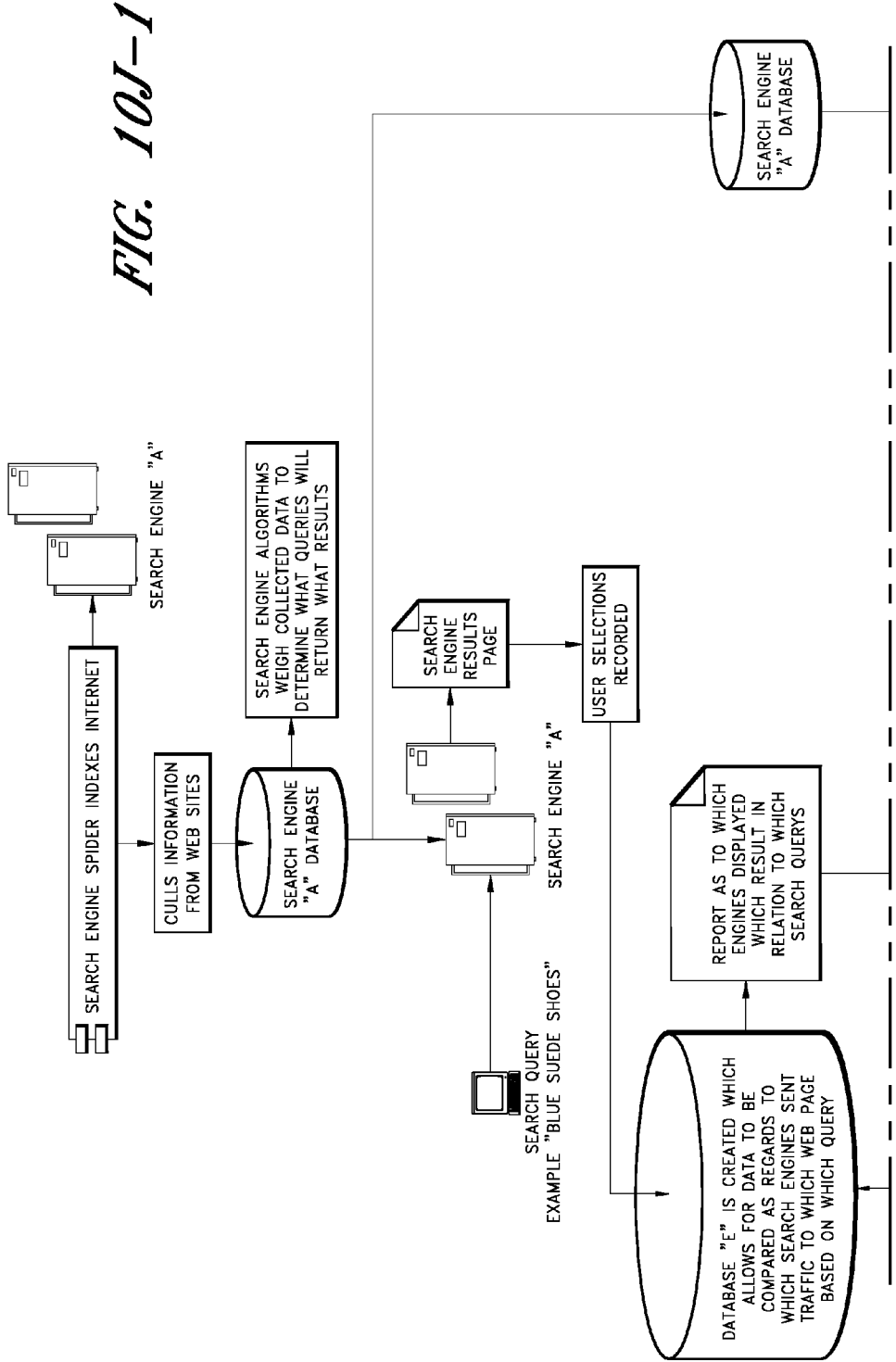

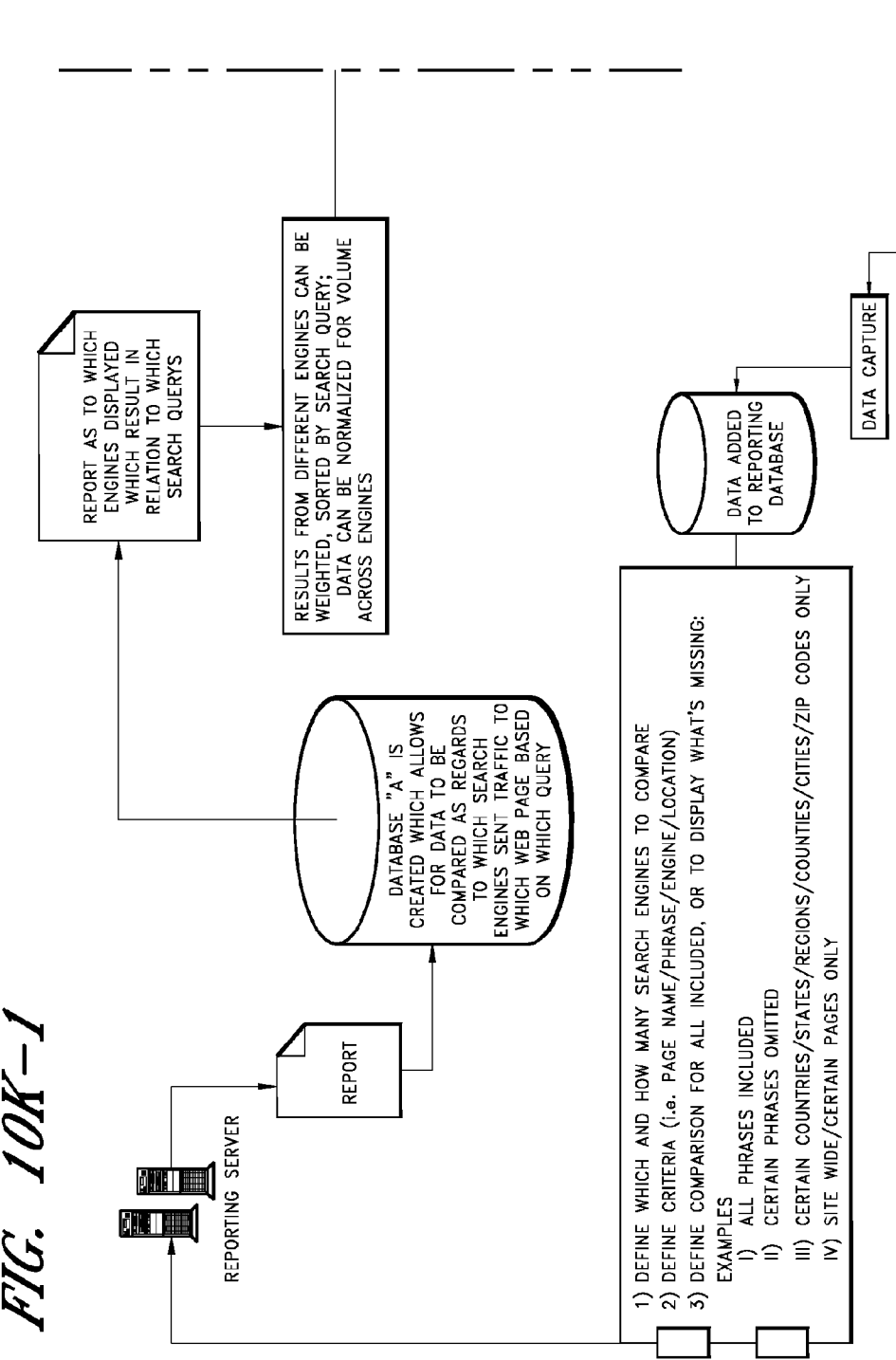

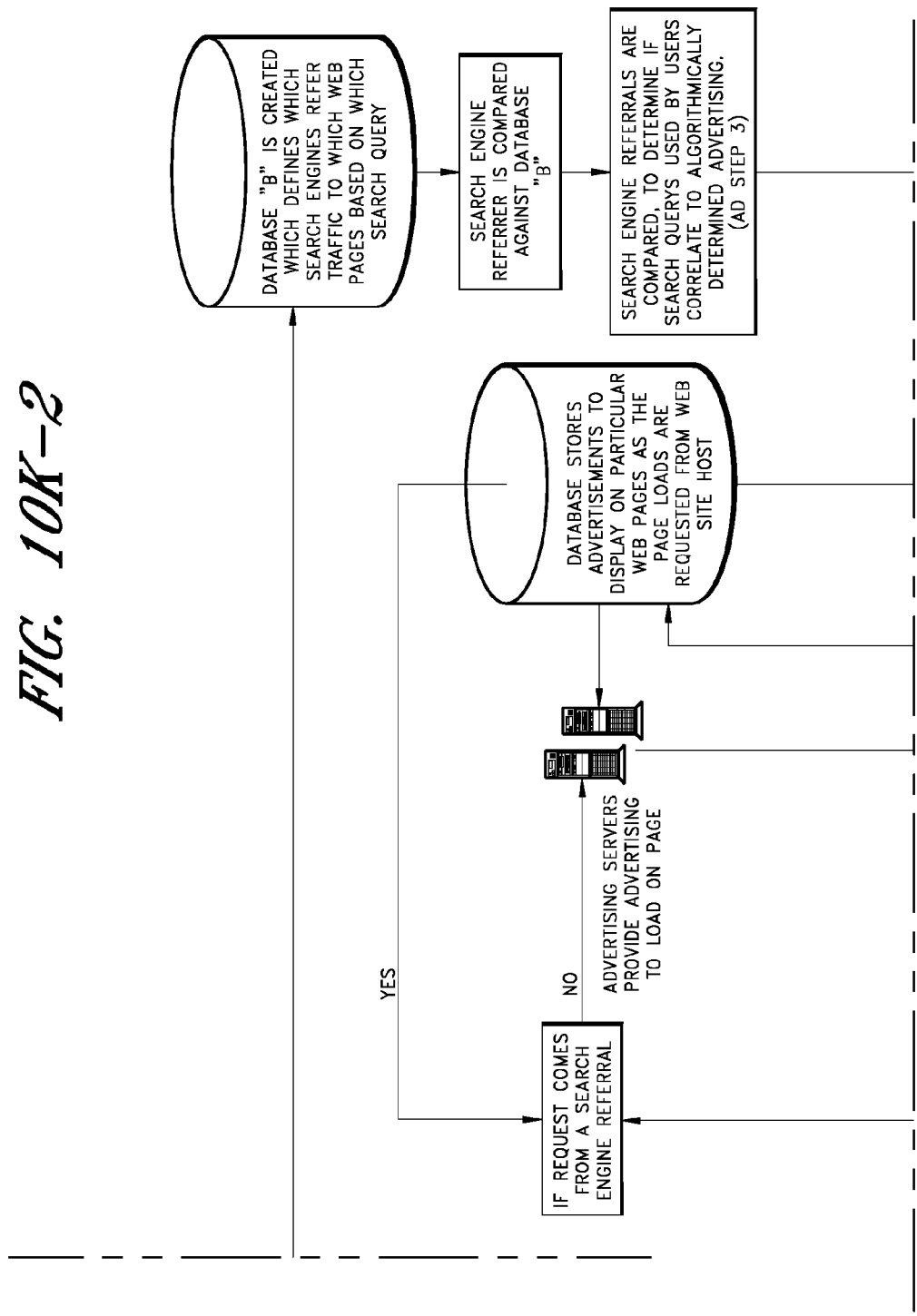

AUTO-REFINEMENT OF SEARCH RESULTS BASED ON MONITORED SEARCH ACTIVITIES OF USERS

CROSS-REFERENCE TO RELATED APPLICATIONS

This application claims the benefit under 35 U.S.C. §119 (e) of U.S. Provisional Application No. 60/690,914, filed Jun. 16, 2005; U.S. Provisional Application No. 60/703,901, filed Aug. 1, 2005; and U.S. Provisional Application No. 60/731,243, filed Oct. 31, 2005, the entire disclosures of which are hereby incorporated by reference.

This application is related to co-pending application entitled "BROWSER-ASSISTED COLLECTION OF SEARCH ACTIVITY DATA," Ser. No. 11/454,298, to co-pending application entitled "ANALYSIS AND REPORTING OF COLLECTED SEARCH ACTIVITY DATA OVER MULTIPLE SEARCH ENGINES," Ser. No. 11/454,305; and to copending application entitled "AUTO-REFINEMENT OF SEARCH RESULTS BASED ON MONITORED SEARCH ACTIVITIES OF USERS," Ser. No. 11/454,299; all filed on the same date as the present application, the entireties of which are hereby incorporated by reference.

BACKGROUND OF THE INVENTION

1. Field of the Invention

The invention generally relates to the collection of search activity data reflective of search activities of search engine users, and to the analysis, reporting, and use of such search activity data.

2. Description of the Related Art

Users often find it convenient to locate information on a network using a search engine. This is particularly true when the source of information is vast, such as information from the World Wide Web. Some examples of search engines include those provided by Google, Yahoo, MSN, Entireweb, Gigablast, Excite, Lycos, Dogpile, Hotbot, Ask, A9, Alexa, and Exactseek.

A search engine typically operates by crawling web sites to retrieve web pages and other types of items (e.g., Word documents, audio files, etc), and by generating an index of these items. When a user submits a search query (typically consisting of a keyword or keyword phrase), the search engine compares the search query to the index to identify any responsive items, and ranks the responsive items for display. The ranking algorithms used for this purpose typically take into consideration various metrics reflective of the relevance of the item. For example, the ranking (and thus display position) of a particular web page in a search result listing may depend on following factors, as well as numerous others: (a) the degree to which the web page matches the search query, (b) the number of other web pages that include a link to this web page, and (c) the frequency with which prior users who have submitted the same or a similar search query have selected this web page from the search result listing. The ranked search result set is typically made available to the user over multiple search results pages, with the first search results page displaying the top N (e.g., ten) results, the second search results page displaying the next N results, and so on.

Companies, webmasters and individuals commonly take measures to increase the rankings or "placement" of their respective web sites in search results listings. For example, the operator of a particular web site may encourage other web site operators to provide links to this web site. The operator can also adjust the content of a web site to make it more enticing to human visitors, and implement a search engine optimization strategy, which is a set of methodologies aimed at improving the ranking of the web site in search engine listings. To assess and increase the effectiveness of these measures, web site operator's frequently use automated tools to monitor the placement of their web sites across a number of different search engines and search queries. These tools generally operate by submitting pre-specified search queries to the search engines of interest, and recording the placement of the web sites and pages of interest in the search results.

One problem with using such automated tools is that they tend to produce inaccurate or misleading results. The lack of quality of the results is typically due to one or more of the following: (1) the search results are based on predefined search queries, which may or may not be representative of actual search queries in common usage; (2) the search results can vary based on a user's, and thus the automated tools, geographic location; (3) the search results can vary based on the server reached, and the quality of the index used by the particular server; (4) the search results can vary based on when the search engine had last been updated; and (5) the results are "moment in time" snapshots, and do not indicate variations during any time period between one search and the next. Another problem with using such automated tools is that they increase the load on the search engine system. In fact, some search engine operators have published terms of service prohibiting the use of such tools.

The foregoing discussion provided for background purposes only, and is not intended to imply that all of the inventions and embodiments disclosed herein address the above-described problems with existing placement monitoring tools.

SUMMARY

A tracking system passively tracks and records searches conducted by actual search engine users. The recorded data for each search event preferably includes the search query submitted, the search engine used, the search result item (e.g., web page) selected, the position (e.g., search result page number) of this item, and the user's IP address. The collected data is aggregated and analyzed to generate data regarding the search queries used to locate and access particular destinations (e.g., web pages and sites). This data may be used for various purposes, such as (1) to generate reports showing, e.g., how users reach a particular destination from different search engines and geographic locations, (2) to select content to display on a destination page, such that the content is relevant to search queries commonly used to locate that page, and (3) to update the database of one search engine to reflect searches conducted on other search engines.

In one embodiment, the system monitors user search activity associated with a particular destination page by incorporating a browser-executable component into the destination page. When the page is accessed as the result of a search, the browser-executable component reports information about the search event to the tracking system. The tracking system may additionally or alternatively use other methods to collect the search activity data, including methods that use other types of client components to report search activity (e.g. browser toolbars and plug-ins), and methods that extract information from log files maintained by search engines, destination web sites, and ISPs.

BRIEF DESCRIPTION OF THE DRAWINGS

These drawings and the associated description herein are provided to illustrate embodiments of the invention and are not intended to be limiting.

FIGS. 9A to 9G are screenshots illustrating report screens generated as a user "drills down" within an interactive report.

DETAILED DESCRIPTION OF PREFERRED EMBODIMENTS

The following description of certain preferred embodiments illustrates some of the ways the various inventive features can be implemented. Nothing in this description is intended to imply that any particular feature, step or component is essential to the invention. The invention is defined only by the claims.

Overview

Figure 1A:
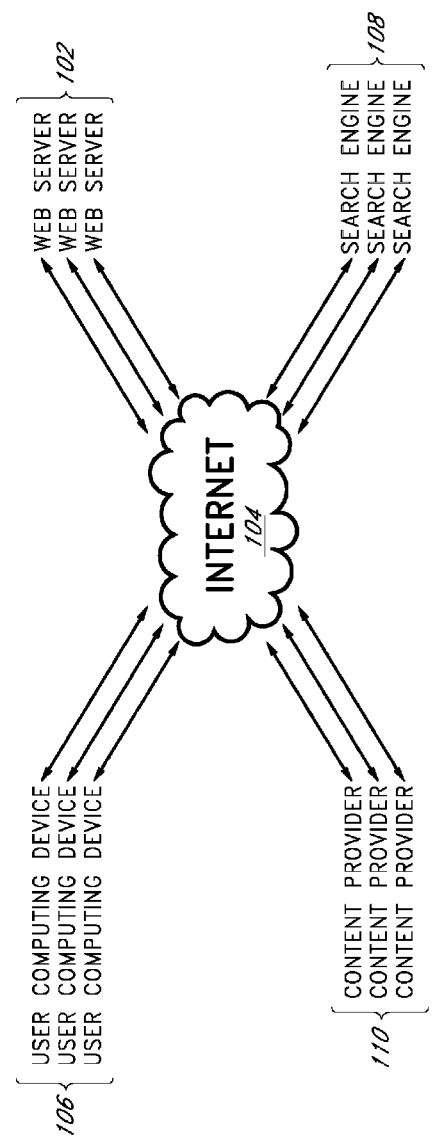
FIG. 1A illustrates an environment in which embodiments of the invention can be practiced.

FIG. 1A illustrates an environment in which embodiments of the invention can be practiced. Web servers 102 serve web pages over a wide area network (WAN) such as the Internet 104, to user computing devices 106. While described primarily in the context of web pages, the principles and advantages described herein are applicable to other types of electronic documents and content items, such as, but not limited to, word processing documents such as Microsoft® Word documents, presentation documents such as PowerPoint®, publishing documents, such as an Adobe® Portable Document Format (PDF) document, blogs, video files, and the like. Search engines 108 access the web servers 102 to index the web pages and other content items available from the web server 102 and to provide convenient searching for a user operating a user computing device 106.

Content providers 110 can provide additional content, such as advertisements or RSS feeds, for display on the web pages. For example, in the context of an advertising program, ads supplied by various advertisers are selected by an ad server system (not shown) for display on web pages of entities that participate in an advertising program. The ad server system and advertising program are typically operated by advertising service provider, such as Google. Typically, the ad server system attempts to match ads to web pages based on the content of such pages, so that the ads tend to be relevant to the interest of users. As discussed below, one aspect of the present invention seeks to improve this process by additionally taking into consideration the search queries commonly used by users to locate such web pages.

As used herein, the term "user" denotes a human that is operating a user computing device, and not, for example, a computer program or "bot" operating a computer to mimic a user, and not a computing device of a search engine, web site, or other content provider's site. The user computing devices can be any type of user device that can be used to conduct searches over a network, such as, but not limited to, a personal or laptop computer, a hand held computer, a set top box for a TV, a personal digital assistant (PDA), or a mobile telephone. These computing devices can be coupled to a network via wired and/or wireless techniques. Typically, these devices run web browser software such as Microsoft® Internet Explorer or Mozilla Firefox, and access the Internet via an Internet Service Provider (ISP). The skilled artisan will appreciate that the principles and advantages described herein will also be applicable to viewer applications other than browsers.

Figure 1B:
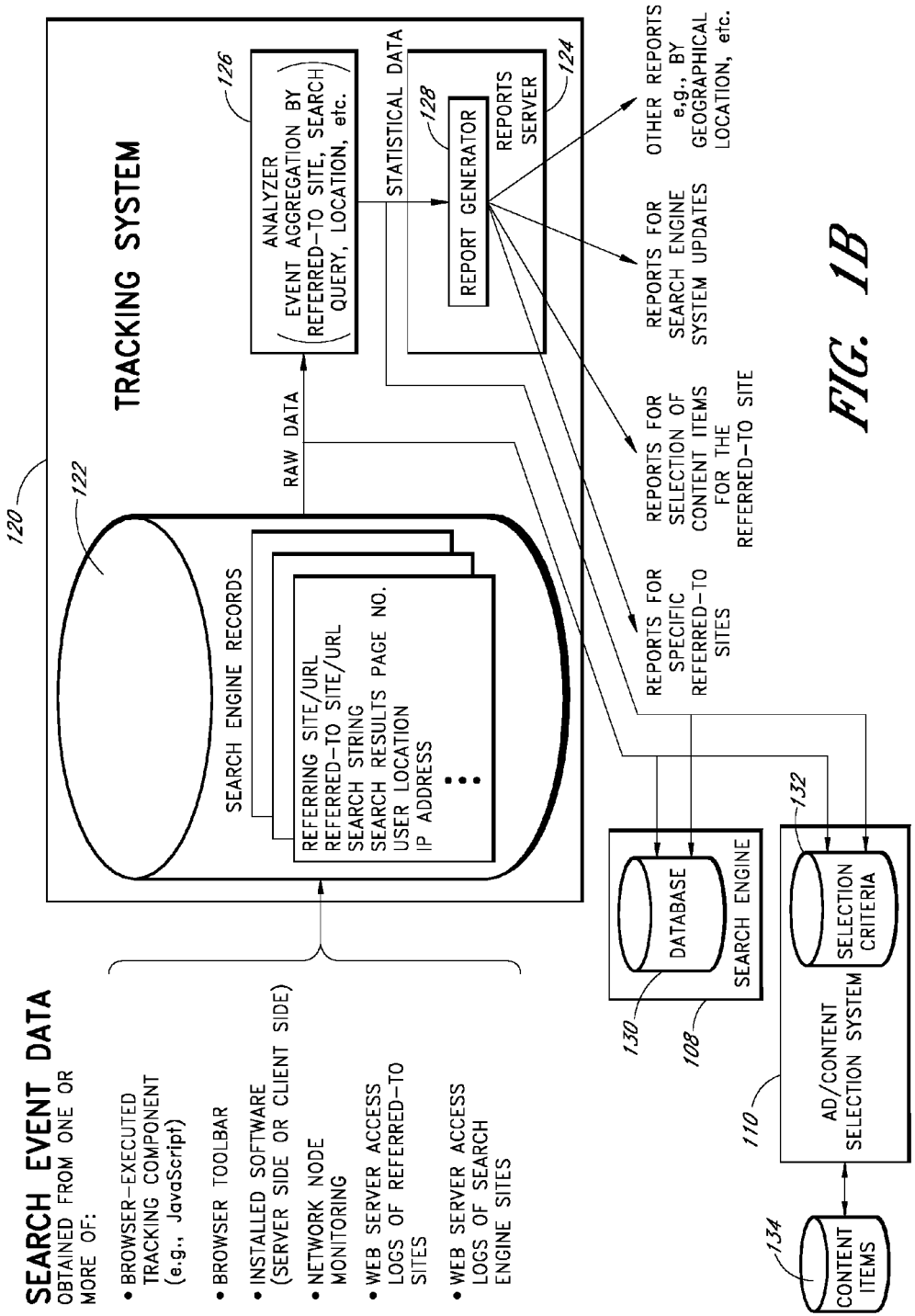
FIG. 1B is a system diagram of a tracking system according to an embodiment of the invention.

FIG. 1B is a system diagram of a tracking system 120 according to an embodiment of the invention. The tracking system 120 includes a data store 122, such as a relational database, that stores search event records, and includes a reports server 124 and an analyzer 126. The tracking system 120 receives search event data (also referred to as "search activity data") and stores the search event data in the data store 122. The search event data can be provided by, for example, any one or more of the following: a browser-executed tracking component such as a JavaScript program, an application embedded in a browser toolbar, another type of software component installed on user computing devices, a network node programmed to monitor and record search and/or other types of traffic, web server access logs of referred-to or "destination" sites, web server access logs of search engine sites, and the like.

As illustrated in FIG. 1B, the information stored for each search event preferably includes the following: (a) the referring site or URL, which is typically but not necessarily a search engine site, (c) the referred-to or "destination" site or URL, (d) the search query (typically a keyword or keyword phrase) submitted by the user, (e) the IP address of the user computing device, and/or a geographic location identifier identified therefrom, and (f) an event timestamp (not shown). Preferably, this search event data consists exclusively or primarily of "passively" collected data obtained from one or more of the sources mentioned above. Consequently, the collected data encompasses the actions of actual search engine users. (It should be noted that the passively collected search event data may also encompass searches conducted by automated tools that are external from, and independent of, the tracking system 120.) The collected data also preferably encompasses searches performed over a number of different search engines.

Because the tracking system 120 collects the search event data passively (i.e., without submitting search queries to any of the search engines), no additional load is placed on the search engines, and the tracking system does not violate the terms of service any search engines. In addition, unlike the data collected by automated placement-monitoring tools, the search event data is descriptive of actual searches performed by actual users; consequently, the collected data is useful for analyzing user behaviors. Further, the collected placement data is representative of what users actually see from their respective geographic locations, as opposed to what an automated tool sees from its particular location or locations.

In embodiments in which the user computing devices run special tracking software (including JavaScript embedded in web pages), the search event data is reported to the data store 122 substantially in real time as users conduct searches and select search results for viewing. The operation of such software is preferably transparent to the user. Where the search event data is obtained from server access log files, these log files are typically initially mined (e.g., on a daily or other periodic basis) to extract the relevant search event data.

The reports server 124 may, for example, be implemented as a web-based reports server through which authorized web site operators, and other classes of users, can interactively request and view various types of reports. The analyzer 126 processes the raw data maintained in the data store 122 to identify search events that satisfy particular criteria, and to generate associated statistical data regarding such events. The statistical data can be used by a report generator 128 to generate human readable or machine readable reports, or both. For example, the operator of a particular web site may be given access rights for viewing reports that separately show, for each of multiple search engines, the search queries used to locate and "click through" to the web site, or a particular page thereof. The reports may also include statistical information regarding, e.g., the number of times each search query was used, the resulting position (e.g., search results page number) at which the destination was displayed in the search results, the geographic locations of the users, etc. (The term "destination" is used herein to refer generally to a web page, web site, or other content item that can be selected by a user from a set of search results.)

Figure 6:
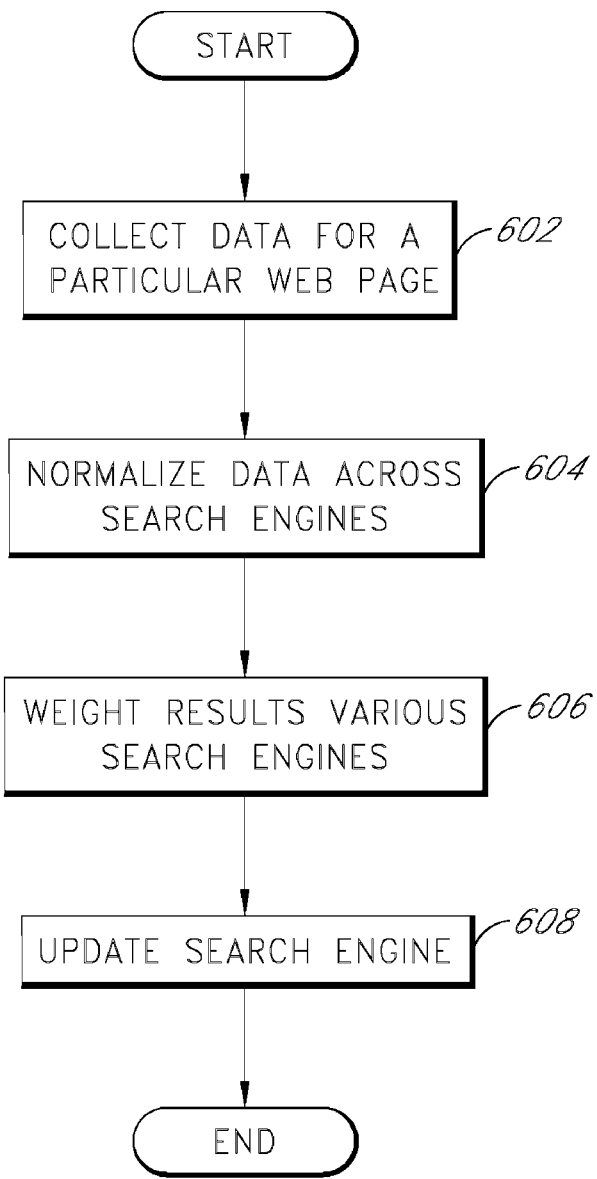
FIG. 6 is a flowchart that illustrates a process for updating a database used by a search engine to identify and/or rank search results.

As another example, data from the data store 122 and/or the analyzer 126 can be provided over a network to a database 130 of a particular search engine 108, which may but need not be one of the search engines for which search event data is collected. This data may be descriptive of, or based on, searches conducted on one or more other search engines, and may identify the search results (or at least those selected by users) returned by these other search engines for particular search queries. Adding this data to the database 130 of the particular search engine 108 enables this search engine to "learn" of behavioral associations between particular search queries and particular destinations, and thus to provide more relevant search results to users. For example, the search engine 108 may learn that users who submit search query Q to other search engines frequently click through to web site A; as a result of this information, the search engine 108 may effectively add web site A to the search results for Q, or may bump up the ranking of web site A for Q. One embodiment of this feature is depicted in FIG. 6, and is described below.

As another example, the collected search event data may be used to update a database 132 of selection criteria of an ad server system, or other type of content selection system 110, that selects content for display on web pages. The content items can be retrieved from, for example, a content items database 134. For example, the search event data collected for a single search engine, or across multiple search engines, can be analyzed to identify search queries commonly used (as determined from calculated usage statistics) to locate and access a particular destination page. These search queries can then be compared to the content of the page, and/or to existing metadata keywords used to select content for this web page, to identify unknown or unexpected search strings (search terms and/or phrases) that frequently lead to this destination page. Ads or other content items associated with such search strings can thereafter be selected for display on this destination page.

Figure 1C:
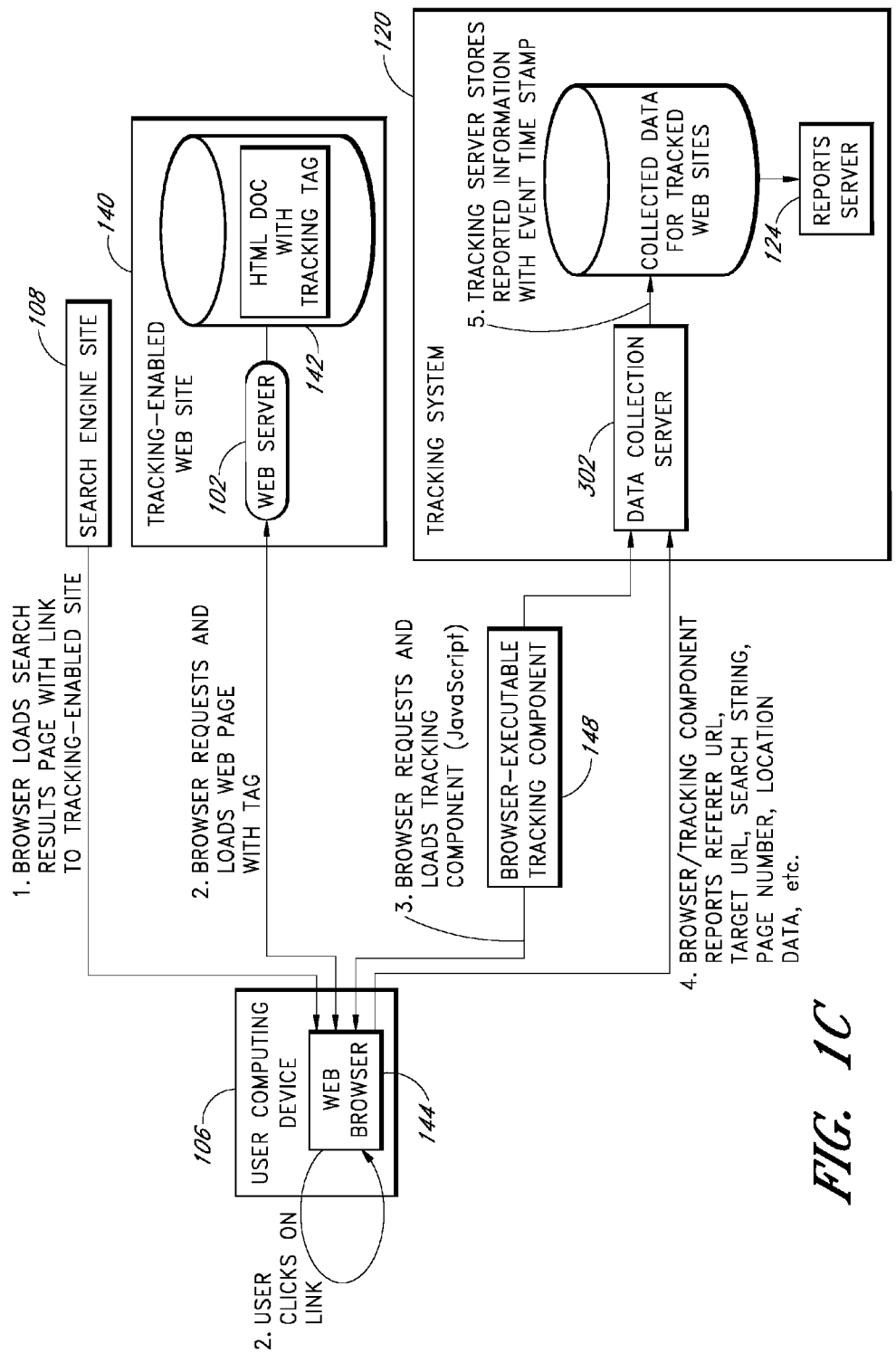
FIG. 1C illustrates an example of data flow among various entities with a browser-executable component providing tracking information.

FIG. 1C illustrates an example of data flow among various entities with a browser-executable component 148 providing tracking information, and represents one of the passive methods that may be used to collect search event data. FIG. 1C illustrates a search engine site 108, a user computing device 106, a web site 140, and a tracking system 120. The web site 140 includes a web server 102 for providing access to a repository 142 of web pages. At least one of these web pages includes a reference or "tag" (e.g., a short JavaScript sequence) that causes browsers to load the browser-executable tracking component 148 when the web page is loaded. Such tags may be included in any number of the site's web pages (e.g., in the HTML document of such web pages). Including the tag in a given web page enables the tracking system to track searches in which the user/searcher clicks through to that web page. A web page that includes such a tag is referred to herein as a tracking-enabled page, and the associated web site is referred to as a tracking enabled site.

Rather than merely including a tag, some or all of the browser-executable tracking code may be statically embedded in the HTML document. The browser-executable tracking component 148 is capable of extracting and reporting search event data over a number of different search engines. An example of a data flow will now be described.

A user of the user computing device 106 initially submits a search query to the search engine site 108. The search engine site provides a search results page to the browser 144 of the user computing device 106. The search results page is then loaded to the browser. The search results page typically has a number of search results with hyperlinks to the underlying resources. The user, via the user computing device 106, can also request additional search results pages if desired.

The user then selects or "clicks through" to a particular search result or "destination." The browser then requests and loads a corresponding destination web page from the web site 140. In some cases, the destination web page is loaded as the result of a redirect command being sent to the browser by the search engine. At this point, the search results page is the referring web page, and the selected destination page is the referred-to page. In the illustrated embodiment, the web page includes a reference to a browser-executable tracking component 148, which is then retrieved by the browser 144 from a data collection server 302 of the tracking system 120 (or from any other suitable source, such as the web server 102 of the tracking-enabled site). As mentioned above, the destination web page itself can also statically include the browser-executable tracking component 148.

When executed by the browser 144, the browser-executable tracking component 148 reports information to the tracking system 120 relating to the search event that led to the tracking-enable destination page. For example, when the referring web page is a search results page from a search engine, such as the search engine site 108, the URL of the referring web page can typically be decoded (by the browser-executable component, or by the tracking system 120 upon receipt) to identify the search engine, the search query, the page from which the link to the referred-to web page was selected, and the like. One advantage to having the browser 144 report the information is that the search event information can be collected across multiple different search engines. This hermits, for example, the search results from multiple different search engines to be compared. To implement this feature, the browser-executable tracking component 148 is configured to decode the referer formats used by a number of different search engines.

The browser-executable tracking component 148 may also optionally be configured to report information about non-search-based accesses to a tracking-enabled page. For example, if a user accesses a tracking-enabled web page from a directory site, or from another non-search-engine site, the browser-executable tracking component 148 may report, and the data store 122 may record, the identity of the referring web site or page. Further, the browser-executable component 148 could be used in combination with cookies to track and record other types of events associated with the destination page, including, for example, one or more of the following: (1) the approximate amount of time spend by the user viewing the destination page, or the amount of such time during which there was mouse movement; (2) if the destination page is configured to display ads, the identity of the particular ad displayed; (3) whether the user performed some action from the web page, such as adding an item to a shopping cart, or selecting a particular link. Thus, the tracking method depicted in FIG. 1C can be used for a wide range of tracking applications.

Figure 2:
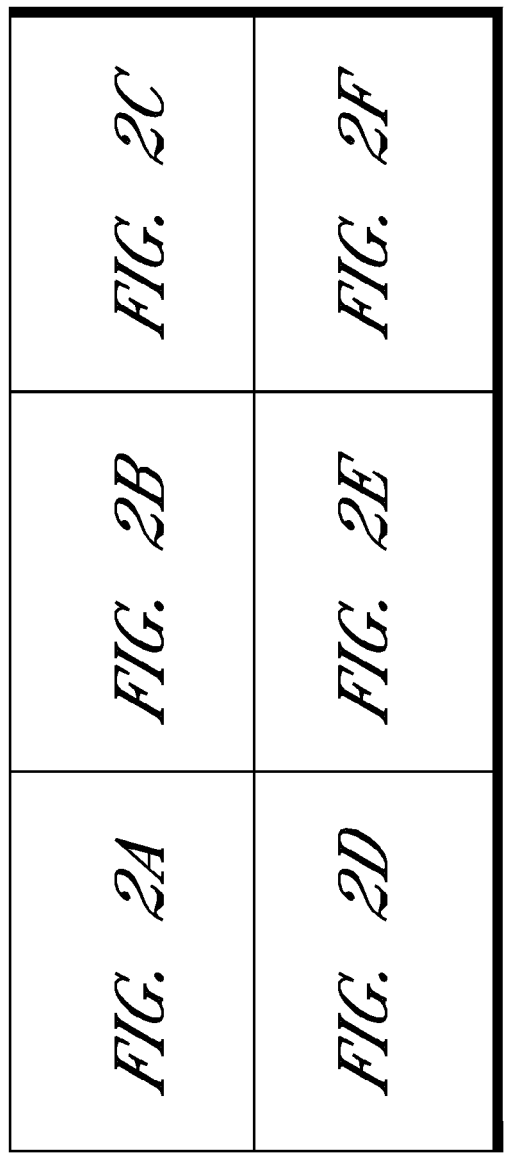
FIG. 2 illustrates an example of a report of search event data collected over multiple distinct search engines.

FIG. 2 illustrates one example of a report that may be generated by the report generator 128 based on search activity data collected in the data store 122. This and the other reports described herein may be generated based on search activity data (also referred to as "search event data") collected using the process shown in FIG. 1C, and/or based on search activity data collected using the other sources and methods described herein. The illustrated report is a screenshot of web browser readable report. It will be understood that the reports can be generated in a wide variety of formats, such as, but not limited to, human-readable formats, machine-readable formats, electronic formats, printed formats, and the like. In the illustrated report, the results of three search engines are compared for a particular date range, in this example, the month of February 2006, for a particular destination web page.

The data is generally represented in columns. A first table 202 includes the search queries (listed under "Phrase") for a first search engine, a second table 204 includes the search queries for a second search engine, and a third table 206 includes the search queries for a third search engine. In the illustrated actual example, the first search engine is the Google™ search engine, the second search engine is Yahoo!® search, and the third search engine is MSN® search.

The report separately lists the search queries used by search engine users to locate and click through to a particular destination or group of destinations, which in this example is a particular web site (collection of web pages)<www.marketingshift.com>. The report can also be constrained for an individual web page. The report also includes statistical data associated with these search queries. The queries and statistical data are shown separately for each of three search engines, which are the Google™ Yahoo!® search, and MSN® search in this example. Each search engine in this example is operated by separate business entity, and uses its own algorithms to rank search results for display.

The first table 202 indicates that the top four search queries used by users to select the web page via the first search engine were "oracle layoffs" with 923 hits, "should i put these pictures of us on myspace or facebook?" [sic] with 572 hits, "oracle layoff" with 567 hits, and "AIM virus" with 439 hits. Other search query results are also shown. The second table 204 indicates that the top four search queries for the second search engine were "myspace aim virus fix" with 296 hits, "oracle layoffs" with 203 hits, "myspace virus" with 192 hits, and "oracle layoff" with 78 hits. The third table 206 indicates that "Exxon Mobile" [sic] with 135 hits, "msn account" with 52 hits, "MYSPACE VIRUS" with 48 hits, and "international cxt" tied with "oracle layoffs" with 41 hits. These tables can readily be compared to identify behavioral differences between the users of different search engines. A column with the heading "H" indicates the highest page position that the referral came from, i.e., if users selected a corresponding link from any of pages 1, 3, and 6, the value under "H" would be 1. A column with the heading "L" indicates the lowest page position used by a user to select a corresponding link to the referred-to page. For example, if a user selected a link from the 63'rd page, a value of "63" would appear under the heading for "L." A column with the heading "A" indicates the average of H and L. A median value can also be used. A column with the heading "K" indicates the page position used to select a link by the last visitor, that is, the most recent user visiting the tracked page (or tracked pages), arrived at your web site from {parameter} (search engine/phrase/country etc). This can be useful when, for example, a particular page has not been accessed in a while. A column with the heading # indicates the number of referrals with the particular constraints invoked. In the illustrated example, each table 202, 204, 206 is constrained to a particular search engine, and each row of the table to a particular search query. A column with the heading "%" indicates the percentage for the particular search query versus all of the search queries of the table (only the tops of which are shown in FIG. 2). The constraints can be further selected or "drilled down" as will be described later in connection with FIGS. 9A-9G. In one embodiment, the reporting generator 128 permits further selection of data by any of the headings indicated in table 202.

Methods for Collecting Search Activity Data

Figure 3A:
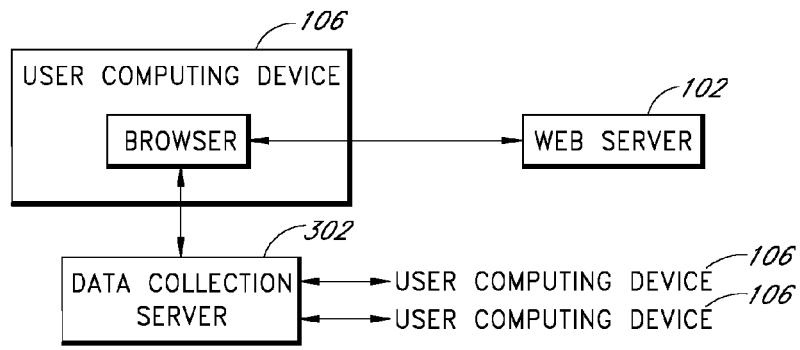
FIGS. 3A-3E illustrate several configurations for collecting search event data.
Figure 3B:
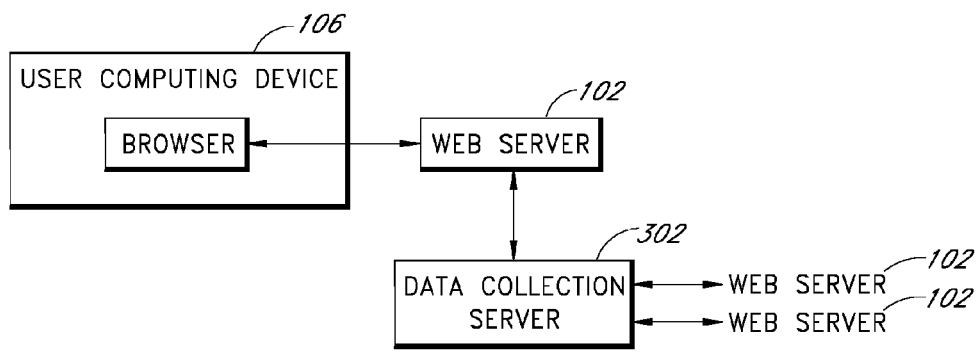

FIGS. 3A-3E illustrate several configurations for collecting the search activity data. While described separately, it will be understood that the different configurations can also coexist such that, for example, a data collection server 302 can receive information from a user computing device 106 as shown in FIG. 3A and can also receive information from a web server 102 as shown in FIG. 3B. When duplicate information from multiple sources (such as a user computing device 106 and a web server 102) are collected, the redundant information can be filtered out by, for example, using IP addresses and timestamps to detect the redundant data. Machine addresses can also be used for user computing devices using proxy servers. Transactions can also be assigned unique identifiers, which can be compared to detect duplicate entries. Other techniques will be readily apparent to one skilled in the art. For clarity, the search engines 108 are not shown in FIGS. 3A-3E. In each configuration shown, a user computing device 106 has already submitted a search query to a search engine 108, and the search engine 108 has provided the user computing device 106 with the search results, which are then viewed by the user with the browser. These search results are typically presented on a search results page.

In the configuration illustrated in FIG. 3A, the user of the user computing device 106 selects a link from the search results page for the desired web page of the web server 102. The user may also select other search results pages from the search engine for a selection further down in a list prior to selecting the link for the desired web page. After selecting the link, the previous search results page becomes the "referer" or HTTP referer, which is also referenced herein as "referring web page." See, for example, RFC 2616 (spelling referrer as referer). Typically, the user's browser sends an HTTP request for the referred-to web page, and also sends header information for the HTTP referer when requesting the referred-to web page from the web server 102.

The web server 102 providing the web page typically receives the Uniform Resource Identifier (URI), which can be a Uniform Resource Locator (URL) or web address of the search results page, by reading the HTTP referer header sent by the user's browser. This information can be stored in a web server access log for later analysis. As will be described later in connection with examples that follow the description of FIGS. 3A to 3E, the URL of the search results page can be decoded to extract the search query entered by the user, the identity of the search engine 108, and an indication of the ranking of the web page within the search results. Other information, such as the IP address of the user computing device 106, cookie information, IP routing information, the IP address of the search engine, and the like, can be captured if available and desired.

However, information about the search results page, such as its URL, is typically not available outside of the web server 102 or the specific search engine providing the search results page. A variety of techniques can be used to provide the data to, for example, a data collection server 302. For example, a browser-executable tracking component 148 may be used, as described earlier in connection with FIG. 1C. One benefit to using such a browser-executable tracking component is that it enables search activity data to be collected over multiple search engines without the need to install any tracking software on the user computing devices, and without the need to collect access or transaction logs files from search engine or web site operators.

In one embodiment, the user computing device 106 executes other (installed) software to send the URL of the search results page to a data repository outside of the web server 102 such as a data collection server 302. Such software can, for example, be incorporated into a browser toolbar or plug-in, or may run as a separate application. (FIG. 3A encompasses this method, as well methods that use a browser-executable tracking component 148.) This software monitors search requests and user selections by, for example, monitoring HTTP requests and sending the requests to the data collection server 302.

One advantage of having the user computing device 106, via the browser or otherwise, execute software to provide the URL of the search results page to the data collection server 302 is that the URL obtained by the software can be less prone to spoofing of the HTTP referer. Another benefit is that it enables search activity data associated with multiple search engines to be captured substantially in real time as search events occur.

In the configuration illustrated in FIG. 3B, the user selects a link from the search results page for the desired web page of the web servers 102. The browser of the user computing device 106 then requests the referred-to web page from the web server 102, which then collects the search query, the search engine information, and optionally other information such as the user computer's IP address, routing information, search engine IP address, and the like, and sends the information to the data collection server 302. Other web server 102 can also provide information to the data collection server 302.

An advantage of the configuration illustrated in FIG. 3B is that the search query and the search engine information can be retrieved from the HTTP referer information and without execution of particular software on the user computing device 106. This can be an advantage as some users object to software, such as toolbars, on their computers, and because some users have browser-execution of certain software, such as JavaScript software, disabled in their browsers. However, browser executable code or other software can also be used to provide the information to the web server 102. A predetermined hierarchical prioritization can also be used in the data collection server 302, when, for example, more than one device, such as user computing device, server, node or the like, sends information about the same transaction to the data collection server 302. The information from the web server 102 can be sent to the data collection server 302 substantially in real time or can be sent in batches. For example, in many cases, the HTTP referer information is maintained in a web site's log file, also known as a web server access log or a transaction log.

One advantage of the configuration of FIG. 3B is that a database for the web server 102 is easily managed. Another advantage is that the data collection server 302 can handle analytics for multiple web servers 102 with the advantages of economies of scale.

Figure 3C:
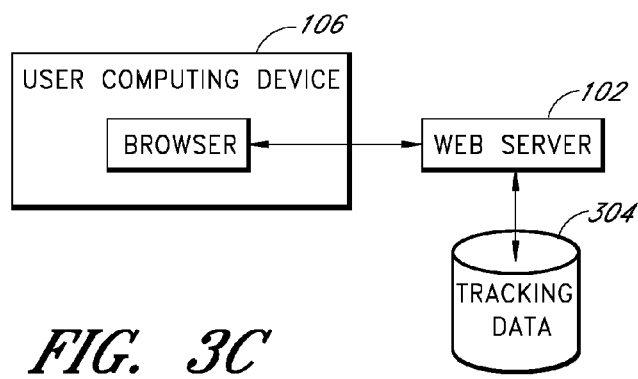

In the configuration illustrated in FIG. 3C, via the user computing device 106, the user selects a link from the search results page for the desired web page of the web server 102. A typical web server 102 maintains some form of server access log. However, many applications that generate web server access logs do not store comprehensive data in the web server access logs, which can limit the amount of analysis that can be performed on the captured data. A browser-executable tracking component 148 can be used to create a supplemental web server access log that contains information such as search queries, search engine identification, IP addresses of users, and the like. The log can be generated by, for example, generating one or more files of delimited text of the transactions. The web server 102 collects the search query and the search engine information from the user computer 106, and stores the information in a database. The techniques described in connection with FIG. 3B can be used to collect the search query and the search engine information, as well as other information as applicable. In one embodiment, the web server 102 analyzes data in a hierarchical manner, such as, a JavaScript component is sent to the user computing device 106, and if information is not returned from the JavaScript component, the web site collects and uses the HTTP referer information. The process of determining which data to use does not have to be performed in real time.

Figure 3D:
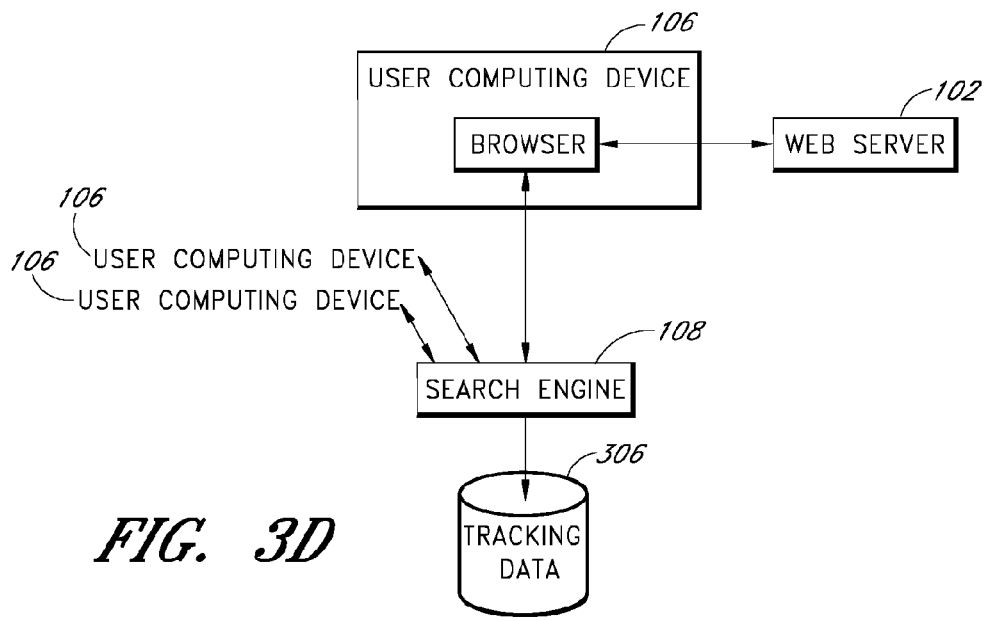

In the configuration illustrated in FIG. 3D, via the user computing device 106, the user selects a link from the search results page for the referred-to web page of the web server 102. The search engine 108 can communicate with multiple user computing devices 106. It will also be appreciated that a search engine 108 can be indirectly accessed by a user by, for example, using an access portal to the search engine 108 from a web site other than the search engine 108. When the link is selected, the search engine 108 collects the search query and information relating to which web page was selected. For example, the search engine 108 will have previously received the search query from the user computing device 106, which can be identified via a cookie or IP address or the like. The user computing device 106 can execute software, such as software embedded in a toolbar or other software to provide the selected or referred-to web page to the search engine 108.

The search engine 108 can also provide an alias for the referred-to web page instead of the direct URL, and then determine which particular web page was selected in the process of forwarding the web page address to the user computer 106. The search engine 108 can also store the ranking of the selected web page, that is, the position within the search results for the selected web page. Further, the disclosed techniques can be used to provide a particular search engine 108 with the ranking information from users, such as other users, who may be using different search engines 108. This data can be used by the particular search engine 108 to improve the relative quality of its search results. The collected information can be stored in a data store 306. The data store 306 can be local to the search engine 108 or can be compiled with results from other search engines, obtained via, for example, browser-executed software, software embedded in a toolbar, or the like.

Figure 3E:
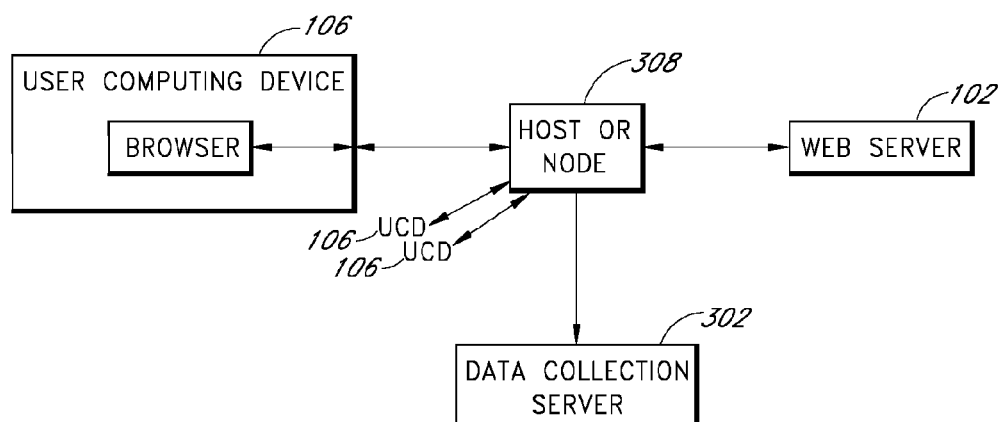

In the configuration illustrated in FIG. 3E, via the user computing device 106, the user selects a link from the search results page for the desired web page of the web server 102. A host or network node 308, such as a network node that monitors the Internet access provided to a user computer 106, tracks HTTP requests related to search queries and tracks selections of search results. The search queries and selections are provided to the data collection server 302. In addition to or alternately, the host computer 308 can provide access to and monitor traffic for the web server 102 or for the search engine 308 (not shown).

Browser-Executable Tracking Component 148

There are a variety of software languages that are executable in a browser. These languages include, but are not limited to, JavaScript, Jscript, XML, cfm, cgi, perl, php, asp, aspx, AJAX, and ".net." The browser-executable tracking component 148 will be described in the context of JavaScript, but it will be understood by the skilled artisan that other types of languages and components can alternatively be used.

The JavaScript code can be statically embedded directly into the destination web page, or can be "dynamically" embedded via a reference or "tag" that causes browsers to load the JavaScript code (from the data collection server 102 or elsewhere) when the destination page is loaded. Some combination of these two approaches can alternatively be used. In one example, the JavaScript code of the referred-to web page from the web server 102 includes an HTML image tag to retrieve an image from the data collection server 302. The actual image does not matter for the purposes of data collection and can be a blank pixel. In one embodiment, the image corresponds to an advertisement or other content item, and the collected data, e.g., search queries, are used to compare to metadata keywords or parameters derived from metadata keywords to select content. An example of such a data flow is described later in connection with FIG. 10E. When executed, the image tag retrieves the image from the data collection server 302, which permits the data collection server 302 to communicate with and collect data from the user computing device 106.

The following code is an example of JavaScript code that, when executed by the browser, determines the HTTP referer:

```
var log_string="";
var log_location=escape(document.location);
var log_referrer="";
var log_referrer_type="0";
var log_d=document;
var log_w='w'+'r'++'t'+'e';
function log_dw(s) {log_d[log_w](s);}
```

Other code can be included to, for example, report the IP address, to report the URL of the referred-web page, to ensure that only one copy of the code executes, and/or to handle multiple frames and different types of browsers. In addition, the browser-executable tracking component 148 may be configured to create a cookie on the user computing device that can be used to efficiently detect repeat visits to a particular tracking-enabled web page from the same referrer. This feature may be used, for example, to detect repeat visits that occur when a user clicks through to a destination page, then uses the browser's "back" button to return to the search results page, and then clicks through to the same destination page again. Such detected revisits can be ignored (not recorded in the data store 122) or discounted.

Figure 4:
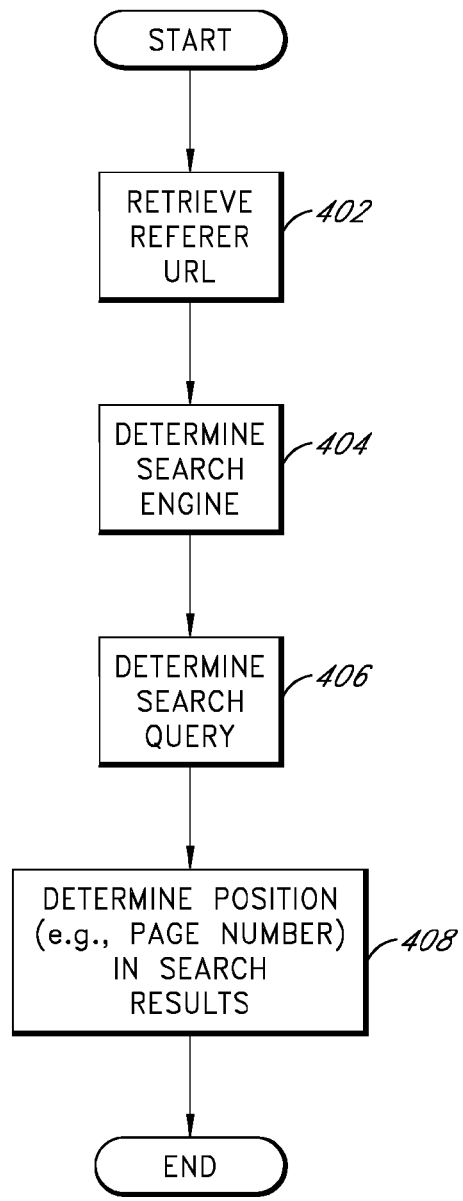
FIG. 4 is a flowchart that illustrates a process for obtaining search event data from referrer URLs.

FIG. 4 is a flowchart that generally illustrates a process for passively obtaining search event data. The process begins by retrieving 402 the referer URL information. The information can be, for example, retrieved from the data store 122 after the data store has been updated with such information. Alternatively, the process shown in FIG. 4 can be implemented on user computing devices by the browser-executable tracking component 148.

After the referer URL is retrieved 402, the process proceeds to identify the search engine used (404), the search query submitted (406), and the position (e.g., search results page number) of the selected link in the search results listing (408). These determinations can be made indirectly by analysis of the referer URL as will be demonstrated in the following examples. The information from the referer URL can also be combined with additional information, such as the time and date of the access of the web page, the IP address of the user. The IP address can be used to identify the user's geographical location. See, for example, <http://www.iana.org/ipaddress/ip-addresses.htm>.

It will be understood that when a user is accessing the Internet through a proxy server, the IP address and geographical location will correspond to that of the proxy server. For most purposes, such as marketing purposes, the approximate geographical location will typically be close enough to be useful. In one embodiment, IP addresses that are determined to correspond to proxy servers are recognized, such as, for example, an IP address for a large dial-up ISP, and the records corresponding to the proxy servers can be filtered from geographical location-based reports. In one embodiment, the user computing device's machine address is tracked. For example, a geographical location can be associated with a machine address of a user computing device 106 that uses a proxy server.

DATA EXTRACTION EXAMPLES

The following examples illustrate the decoding of an HTTP referer URL for various search engines. Decoding of other search engine HTTP referer URLs will be readily determined by one of ordinary skill in the art. It will be understood that the formats used by search engines to embed information in the URLs can change over time. The first two examples are from Google™.

Example 1

<http://www.google.ca/search?hl=en&q=goodniteirene&btnG=Search&meta=cr%3DcountryCA>.

Example 2

<http://www.google.ca/search?q=good+nite+irene&hl=en&lr=&start=20&sa=N&filter=0>.

In Example 1, the referred-to (destination) web page can be determined to have been in the top 10 of Google's results for the particular search query, as the URL does not indicate a change in the default number of 10 listings per page and it can be determined that the URL was the first page. Search engine results can also vary depending on the geographical location determined for the user computing device 106 and the particular search engine's site. The "http://www.google.ca/" portion refers to the referring site, which is Google's Canadian search site. The "search?" indicates that the referer is a result of a search on Google's web site. The "hl=en" portion indicates that the language is English, the "q=goodniteirene" portion indicates the search query submitted, the "btnG=Search" portion indicates the search button triggered the query, and the "meta=cr %3DcountryCA" refers to the region where the search engine site is located.

The fact that the query was triggered by a search is useful information to distinguish a search query from a directory listing, as is the wording of the query, and the particular referring site of the search engine. The fact that a "start=" portion is absent indicates that the result was on page 1 of the search results. The second example will illustrate an example of the "start=" portion.

When, for example, "start=10" is present, then the referred-to web page was listed on page 2 of the search results. If "start=20" is present, then the referred-to web page was listed on page 3, and so forth.

In Example 2, the referred-to web page was listed on page 3, and should be in the top 30 search results, as opposed to, for example, a directory listing. A "start=20" indicates page 3 of the search results. An "lr" is the "location range" indicating location on page 2 of the search results. Using 20 for page 2 allows for further definition in the future: i.e., 21 would be the first result on page 2 of the search results, etc. The "filter=0" portion specifies the filters that have been preset by the end user, such as, for example, "no adult content."

Examples 3 and 4 illustrate information retrieval from a Yahoo!® search.

Example 3

<http://search.yahoo.com/search?p=good+nite+irene&prssweb=Search&ei=UTF-8&fr=FP-tab-web-t&fl=0&x=wrt>.

Example 4

<http://search.yahoo.com/search?p=goodniteirene&sm=Yahoo%21+Search&toggle=1&ei=U    TF-8&xargs=0&pstart=1&fr=FP-tab-web-t&b=11>.

In Example 3, the structure is similar to those of Examples 1 and 2, with the following adjustments: "p=" prefaces the search query, "prssweb=Search" indicates search results, as opposed to a directory listing. In Example 4 the "sm=Yahoo+Search . . . " is an alternate indication that the query was a search.

When no "b=" element is included in the URL for the referring web page, then the link for the referred-to web page was listed on page 1 of the search results. When "b=11" is present, then the link for the referred-to web page was listed on page 2 of the search results. A "b=21" would indicate that the link for the referred-to web page would was on page 3 of the search results, and so forth.

Examples 5 and 6 illustrate information retrieval from an MSN® search.

Example 5

<http://search.msn.com/results.aspx?FORM=MSNH&srch_type=0&q=good+nite+irene>

Example 6

<http://search.msn.com/results.aspx?q=goodniteirene&first=11&count=10&FORM=PERE>

When no "first=" element is contained in the URL for the referring web page as shown in Example 5, then the link for the referred-to web page was listed on page 1. When "first=11" is present, then the link for the referred-to web page was listed on page 2 as shown in Example 6. A "first=21" would indicate that the referred-to web page was listed on page 3, and so forth.

Examples 7 and 8 illustrate information retrieval from an "Excite" search.

Example 7

<http://msxml.excite.com/info.xcite/search/web/goodniteirene>.

Example 8

<http://msxml.excite.com/info.xcite/search/web/goodniteirene/21/20/2/-/0/0/1/1/1/1/-/-/-/on3%253A1117819743567%253A0%253A/-/-/-/-/-/-/-/-/-/-/-/-/-/-/-/-/-/-/-/-/-/good-niteirene/-/1/-/-/-/-/-/-/-/-/-/0>.

In Example 8, note that the first portion after "/web/goodniteirene/" is "21," and then the next element is "20." The "21" indicates that the link for the referred-to web page was on page 2 because the count (next portion) is "20" so that page 2 starts with search result number 21. Excite is defaulted to 20 search results per page. Example 7 corresponds to an HTTP referer for a link to a referred-to web page, where the result was listed on page 1 of the search results.

Examples 9 and 10 illustrate information retrieval from a LYCOS® search.

Example 9

<http://search.lycos.com/defaultasp?loc=searchbox&tab=web&query=good+nite+ireneC mit.x=0&submit.y=0&submit=image>.

Example 10

<http://search.lycos.com/default.asp?query=good+nite+irene&first=11&pmore=more>.

When no "first=" element is contained in the URL for the referring web page, as in Example 9, then the link for the referred-to web page was on page 1 of the search results. When "first=11" is present, as in Example 10, then the link for the referred-to web page was on page 2 of the search results. A "first=21" would indicate that the link for the selected web page was on page 3, and so forth.

Figure 5:
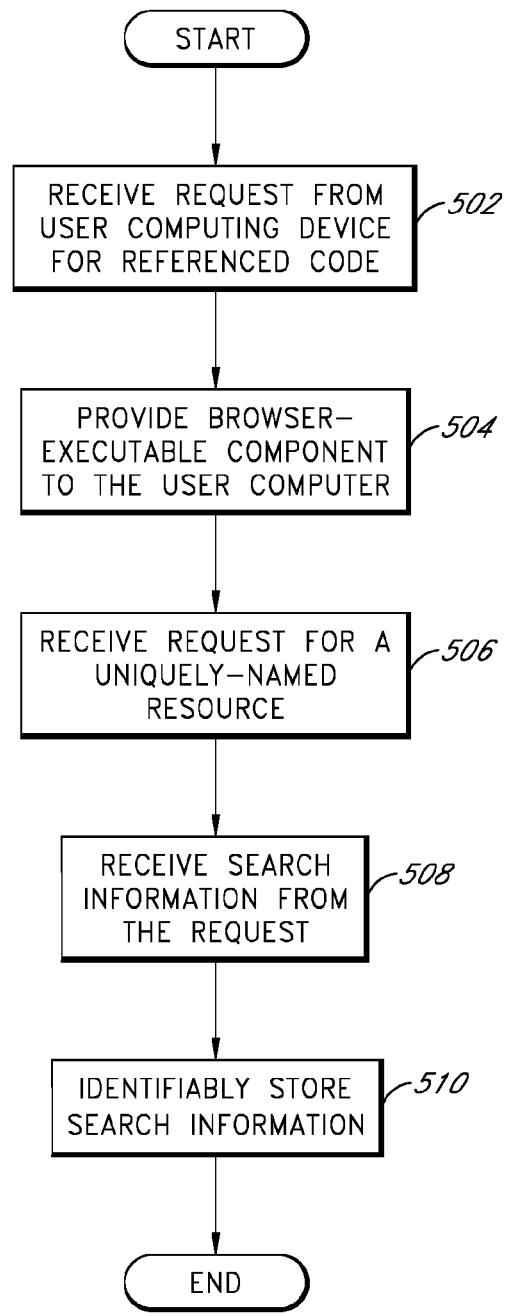
FIG. 5 is a flowchart that illustrates a process for collecting search event data using a browser-executable component.

FIG. 5 is a flowchart that illustrates a process implemented by the data collection server 302 for collecting search activity data from a user computing device 106 that has or is in the process of loading a tracking-enabled web page. It is assumed in this example that the tracking-enabled destination page is loaded as the result of the user's selection of this page from a search result listing. The process begins by receiving 502 a request from a user computing device 106 for the executable code 148 referenced within the referred-to page. For example, the web page can include a reference to the browser-executable tracking component 148 on the data collection server 302. The reference can be relatively simple, as illustrated by the following example using JavaScript code: <script type="text/javascript" src="http://log.enquisite.com/log.js?id=enquisite"></script>. This causes the browser to request the browser-executable tracking component 148 (named log.js) from a server operating as the data collection server 302 (from the server addressed at log.equisite.com in this example). The external referencing of the browser-executable tracking component 148 permits updates to be made relatively easily (without having to update each tracking-enabled web page). While tracking information, such as the URL for the HTTP referer and the URL of the web page that is being tracked, can be collected by the data collection server 302 when providing the external browser-executable component 148, it is preferably not collected at that time for reasons that will be discussed below.

The browser-executable tracking code 148 executes when the web page is loaded and each time that the web page is reloaded. However, if the external browser-executable tracking component 148 (external script) has already been fetched by the browser, then the browser could retrieve the external browser-executable tracking component 148 for subsequent reloads of the page or even loads of other web pages with the same referenced external browser-executable component 148 from a browser cache and without having to download the external browser-executable component 148 from the data collection server 302. In this case, then the data collection server 302 would not receive a request for information and would therefore not collect tracking information.

A more robust solution is described. After the browser-executable component 148 is loaded by the browser (either by being embedded in the web page or externally referenced), it is executed as the page loads. If the page is reloaded, it will also re-execute. In one embodiment, the browser-executable tracking component 148 has instructions for requesting a uniquely-named resource (unique to the browser) from the data collection server 302. For example, randomization techniques, such as random numbers or characters, can be appended to the name of a file. In another example, an incrementing count is appended to the name of a file. The browser then sends a request for the file from the data collection server 302. Since the filename is unique each time the browser-executable component 148 is executed, a local copy of the file is not available in the browser's cache. This forces the browser to retrieve the file from the data collection server 302, which then receives the request (506) for the file. While the filename may be random, the data collection server 302 can be configured to generate a file with the requested filename. Upon receiving the request (506) for the file from the browser, the data collection server 302 can then determine the IP address corresponding to the browser, the URL for the referred-to web page, the URL for the referring web page, and the like (508).

In one embodiment, the file corresponds to a one-pixel image file that is transparent. Such an image has little effect on the displayed web page. However, it will be appreciated by the skilled practitioner that any type of file can be retrieved, such as, but not limited to, image files, text files, video files, audio files, and the like. The browser-executable tracking component 148 can also include code for determining search related information, such as the search engine, the search query, the page number of the search results, the referred-to web page, and can further include code for handling of multiple frame, multiple-domain-frames, wherein each frame behaves like a separate browser, for handling if a reference to the browser-executable tracking component 148 is present more than once, and the like.

The data collection server 302 then receives and stores the search event information from execution of the browser-executable tracking component 148 (blocks 508 and 510 in FIG. 5). The browser-executable tracking component 148 can provide the information in a variety of ways. For example, the browser-executable tracking component 148 can provide raw URL information. The browser-executable tracking component 148 can provide the data collection server 302 with information, such as, but not limited to, the URL for the referring web page and the URL of the selected web page. The URL of the referring web page can then be deconstructed by the data collection server 302, either as the data arrives or later in a batch process, to provide, for example, the search query, the search engine used, and the like, as described earlier in connection with Examples 1-10. In another embodiment, the browser-executable tracking component 148 sends pre-processed information, such as the search query, the search engine used, etc., already parsed from the browser. The extracted search event data elements are ultimately stored in the data store 122 in a format that is amenable to efficient data analysis and mining, together with an event timestamp.

In one embodiment the data is maintained in the database 122 as follows:

| Field Extra | Type | Null | Key | Default |
|---|---|---|---|---|
| id auto_increment | int(10) unsigned | | PRI | NULL |
| log_date | int(10) unsigned | YES | MUL | NULL |
| ip | int(10) unsigned | YES | | NULL |
| country | char(2) | YES | MUL | NULL |
| region | varchar(254) | YES | MUL | NULL |
| city | varchar(254) | YES | MUL | NULL |
| postal_code | varchar(254) | YES | MUL | NULL |
| referrer | text | YES | | NULL |
| location | text | YES | MUL | NULL |
| phrase | text | YES | MUL | NULL |
| engine | varchar(128) | YES | MUL | NULL |
| page | mediumint(8) unsigned | YES | | NULL |

Descriptions of the fields are as follows. The id field is for a log entry number. The log_date field is for a time stamp. The ip field is for the IP address of the user computing device 106. The country field is for the country corresponding to the IP address. The region field is for a state or province within the country. The city field is for the city. The postal_code is for a zip code or the like associated with the IP address. The referrer field is the character string, e.g., a URL, corresponding to the referring web page. The location field is the visited web page, e.g., a URL for the visited web page. The phrase field is the search query. The engine field is an identifier for the search engine used. The page field is a page number within the search engine's results that was used.

An example of a process for generating a report from a collection of search data will be described later in connection with FIG. 8. However, it should be noted that the tracking information obtained via use of the browser-executable tracking component 148 is not limited to web pages found via search engine results. Other web page accesses may also be tracked to monitor the general behavior of multiple users.

Updates to Search Engine Databases

FIG. 6 is a flowchart that illustrates a process for updating a database of a particular search engine to improve the search engine's ability provide relevant search results. This process enables this search engine to take into consideration the search results selected by users of other search engines. Although depicted in the context of a particular destination web page, the illustrated process can be repeated for many different web pages.

The process begins by collecting or aggregating 602 search event data stored in the data store 122 for the particular destination page, collection of web pages, web site, etc. The data may be aggregated in connection with a particular search query used to access the destination page, and the process may be repeated for other search queries. Thus, for example, all search events (across all search engines) for which the user submitted a particular search query and then selected the destination page may be aggregated for analysis.

The process then proceeds to normalize 604 data across search engines. The process normalizes the data to balance the effect of search engines having varying amounts of traffic.

The data itself can be normalized, or a normalizing factor can be computed and used later. For example, the total number of referrals across search engines can be normalized such that, for example, if search engine A has 10 times more referrals than search engine B, the search queries can be compared on a relative basis.

The process then proceeds to weight 606 the results from the various search engines for comparison. For example, a statistical analysis of the search results of the various search engines can be performed. Some search engines can be considered to provide more relevant search results than other search engines. In addition, an analyst manually inspecting the data can decide to custom weight search engines when some appear to be providing relatively relevant searches, and underweight those appearing to give relatively irrelevant searches. In another example, a particular search engine to be updated can be effectively weighted as zero (can also be not collected) such that the results of the other search engines influence the search engine to be updated. The weighting can also be even.

The process then proceeds to update 608 the search engine. This can be done, by, for example, merging part of a newly generated database into the existing search engine database. For example, a portion of the existing search engine database can be updated such that the web page's position in search results is influenced (up or down). The foregoing technique can be performed automatically or partially manually. An example follows. This example is generally related to the data flow diagram illustrated in FIG. 10J.

A search query for "Blue Suede Shoes" results in one hundred results from Search Engine "A." 500 queries are performed on search engine A for that search query daily, and 30 distinct results are selected by users. In collecting data from web sites, it becomes apparent that Search Engine "B" also gets searched 500 times per day for the query "Blue Suede Shoes," and that 20 distinct web pages are selected by users whose activities can be tracked. If the number of search queries varies, the number of results can be correspondingly normalized.

The resource names or URLs that were selected can be compared to determine if the pages selected from Search Engine "B" are found in database "A." Missing pages can be considered for inclusion in the results. In the following example, engineers value Search Engine Index/Databases "A" and "B" approximately equally. If one is considered better than the other, unequal weighting can be used. Continuing with the example, if the number 5 search result in search engine "A" received a certain number of click throughs, but the numbers 1-3 referred-to web pages from Search Engine "B" received more click throughs than the number 5 search result of search engine "A," and were either not in the database for search engine "A," or were listed lower in the results, then those pages should be algorithmically considered for inclusion in the search results from database "A," or higher ranking in the results." The prominence of the selection of the numbers 1-3 referred-to pages by actual search engine users is indicative of the relevance of the numbers 1-3 referred-to pages. The foregoing illustrates an example of using a ranking by user-selection of web pages from another search engine's search results (B) to improve a search in a search engine (A).

In another example, an engineer for Search Engine "A" can compare the rankings of pages for search queries of Search Engine "A" with the page positions of referred-to web pages for the same search queries of one or more other search engines. This makes it possible for the engineer to take advantage of search page position data of other search engines without running searches on those engines.

The results of a user-tracking database can be incorporated into a search engine database as a factor in determining the placement of a web page in search results much like the current use of a title tag or a keyword tag. The weight, or algorithmic score of this new information can be adjusted, by, for example, an analyst, and a modified search engine database which incorporates the original search data plus usage data from competitive engines, can be generated. This illustrates that search results can be modified by usage trends in third party engines. This permits a search engine to compensate for errors or flaws in its particular algorithms or even to compensate for limitations of crawler technology by incorporating popular human selected results from third-party search engines into its search results.

Blocks 602-606 of the process shown in FIG. 6 can be performed by the analysis component 126 of the tracking system 120 (see FIG. 1B), and the result then sent to the relevant search engine system or systems to perform the database update. Alternatively, the raw event data can be sent to a given search engine system, which may apply its own normalization and weighting algorithms (blocks 604 and 606).

The information added to the search engine's database 130 may include weight values that correspond to particular search query/URL pairs. Each such weight value may represent the strength of a behavioral association between the particular search query and URL, and may be based on search event data passively collected over multiple distinct search engines. These weight values may be incorporated in the search engine's search result ranking process using methods well known in the art. Weight values that are specific to particular geographic regions (e.g., based primarily or exclusively on behaviors of users in the respective regions) may optionally be calculated and used, such that the search results (including rankings) presented to a user are dependent on the user's location.

Selection of Content Displayed on Web Pages

Figure 7:
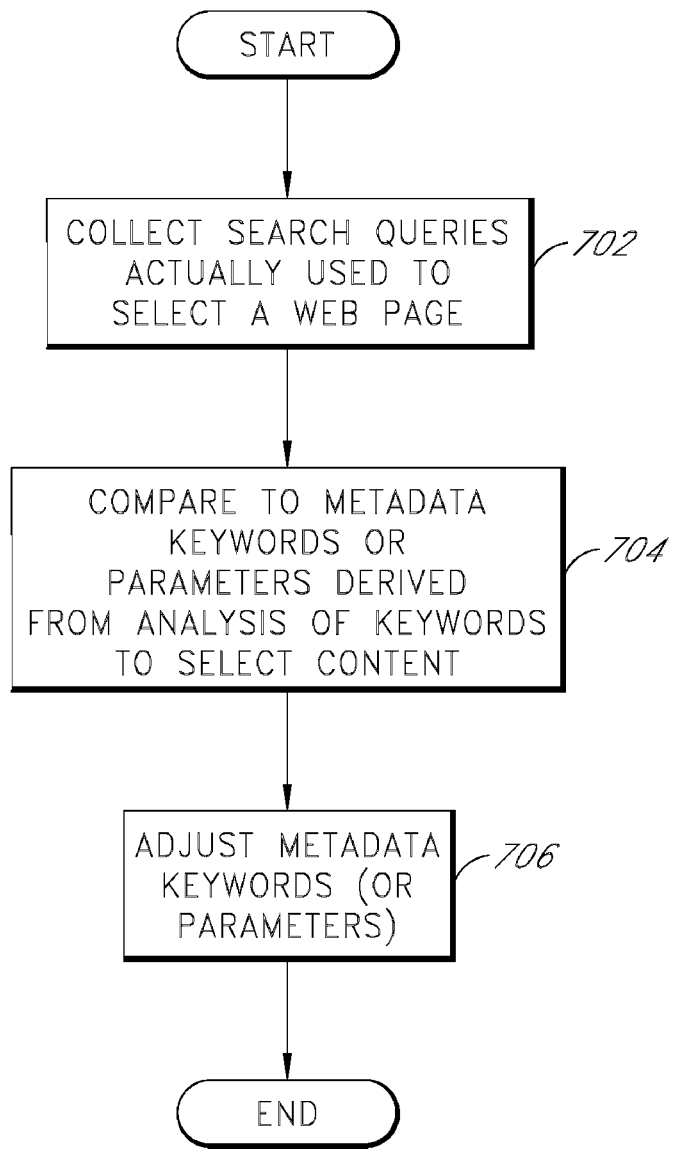
FIG. 7 is a flowchart that illustrates a process for comparing search queries used to find a particular web page to metadata keywords used to select supplemental content for the web page, such as advertising content.

FIG. 7 is a flowchart that generally illustrates a process of comparing a search query actually used by users to find and select a particular web page to metadata keywords (terms and/or phrases) of the web page used to select supplemental content for the web page, such as advertising content or content from a Real Simple Syndication (RSS) feed or other feed. While the illustrated process can be run at any time, including on an ongoing basis, for the purposes of illustration, the process will be described with metadata keywords from the referred-to web page of the web server 102 already selected, and one or more advertisements associated for display with the web page based on these metadata keywords. A related data flow diagram is illustrated in FIG. 10K.

The process begins by collecting 702 search queries actually used to select the destination web page, typically across multiple search engines. For example, all search events which led to selection of the destination page may initially be identified, and the N (e.g., twenty) most frequently occurring search queries in these events may then be identified.

The process then compares 704 these search queries with the metadata keywords, or parameters derived from analysis of these keywords, used to select the supplemental content, such as an advertisement. Statistical analysis can be used to make the comparison. If the search queries and the metadata keywords do not match relatively well, such as, to within a predetermined percentage, then it can be determined that the actual content of the web page may differ from that of the metadata keywords. The predetermined percentage will vary in a relatively broad range depending on the content of the web page, and applicable percentages will be readily determined by one of ordinary skill in the art. A user's selection of a referred-to web page based on a particular search query is likely to be a relatively good indicator of the appropriateness of the search query as metadata keywords.

The process then proceeds to adjust 706 the metadata keywords or the parameters derived from analysis of these keywords as appropriate. For example, when the history of the search queries indicates words not present in the metadata keywords, the process can add these words from the search queries as keywords or parameters for the selection of advertisements to the database for the advertisement selection. On the other hand, when the search queries indicate an absence of the usage of words in the search query that are already metadata keywords or parameters, these words can be removed from the database used for the advertisement selection.

The metadata keywords assigned to a given page via this process may be used to select ads, RSS feeds, and/or other types of content to incorporate into destination page. For instance, if the destination page has been configured to display ads served by an ad server system, a browser that loads the destination page (as the result of a search or otherwise) will typically request an ad from the ad server system. The ad server system will then look up the metadata keywords for this page from its database, use an ad selection algorithm to select from the available ads that are associated with these metadata keywords, and return the selected ad for display. The ad selection can also be done manually or by a combination of manual techniques and algorithmic techniques. By using the collected search activity data to update the metadata keywords as described above, ads that correspond to the intent of users, as opposed to merely the content of the destination page, are more likely to be displayed.

The data collection techniques can also be used to select advertisements or other content items which, while the advertisement may not properly be associated with the user-selected web page, nonetheless provides a statistically-appropriate advertisement based on prior user selections. For example, selections by humans of a particular search result listing typically indicate that the search result is relevant. However, users do not always select appropriate web pages from a search results page, and the search results pages do not always have appropriate listings. This can cause an inconsistency not only between what the user had searched for, but also for an advertisement for that user. The disclosed data collection techniques can be used to select an appropriate advertisement for a web page, even if the other content of the web page is not relevant with the user's intent.

For example, a web page which discusses the exploits of the musical group "The Who" may contain lots of verbiage concerning concerts, events, albums, and likes and dislikes of the band members. If on-page advertising is enabled for that web page, advertising can be selected manually, or algorithmically served based on the inventory of web pages and/or number of advertisers bidding for related terms, and driven by the content. However, search engines do not always categorize web pages properly. In such a case, the user of a search engine may arrive at the web page based on a search referral for a search query completely unrelated to the search query.

For instance, the web page relating almost exclusively to the musical group "The Who," and its guitarist "Peter Townshend" might mention that "Joe Jackson" performed as the opening act at a concert in 1982. Algorithmically, advertising displayed on the web page should relate to "The Who."

However, it is possible that a search engine determines that the usage of "Peter" and "Jackson" on the same page is relevant to the search query "Peter Jackson." When the search query "Peter Jackson" is entered into the search engine, this web page relating to "The Who" may be displayed in a prominent position in the search results, and inadvertently selected by users looking for information on the film director who made the Lord of the Rings movies. The inadvertently-selected web page for the music group "The Who" would load, with advertising relating to the music group "The Who."

In one embodiment, the advertising server takes into account the search engine referrer, and also the search query. If it is determined that either most and/or a mathematically significant number of referrals from the search engine to that particular web page arrive as a result of the search query for "Peter Jackson," then advertising relating to "Peter Jackson" can be displayed on the web page when accessed from this search engine. Normally, this advertising would be irrelevant to "The Who," and would not be displayed. However, its inclusion would be viewed as highly relevant by the user, who would be more inclined to click on the advertising related to "Peter Jackson," than advertising related to "The Who."

In this embodiment, the advertising server can use both advertising which it had algorithmically determined to be relevant, and using selected search queries, can also use advertising that is based on trends from particular search engines or all search engines.

As will be recognized, the above-described embodiment can be varied in a number of ways. For instance, each of the search queries frequently used to locate a particular destination page or site can be individually compared to the destination's content to compute its variance. These variance values can then be used to select ads or other content items that do not closely match the destination's content, but which correspond to the likely intent of a significant portion of the users who access the destination. Further, frequency-of-usage data for particular search strings/destination pairs can be used to influence the frequency with which corresponding content items are dynamically selected for display on the destination. This frequency of usage data can be based on submissions to all search engines, or based solely on submissions to the search engine that is now referring a user to this destination.

As another example, the process of selecting metadata keywords (or otherwise controlling the selection of content items) for a particular destination can be performed separately for each of a plurality of geographic regions (cities, states, zip codes, countries, etc.). With this approach, different metadata keywords may be assigned to the destination for different geographic regions. When a user in one of these geographic regions accesses the destination (via a search engine or otherwise), the content selection system may use the corresponding region-specific set of metadata keywords to select the ad or other content item to display.

Report Generation and Drill Down

Figure 8:
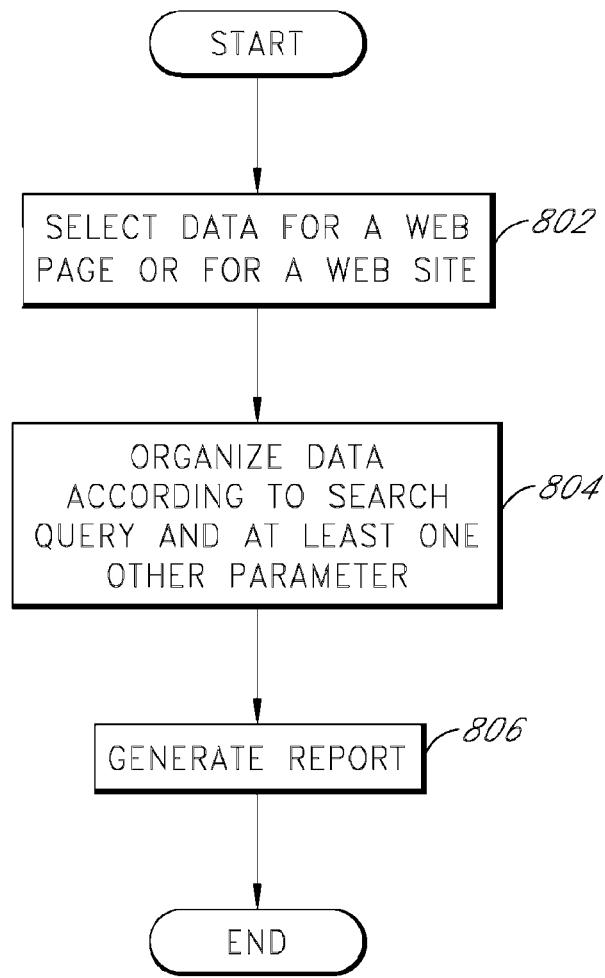
FIG. 8 is a flowchart that illustrates a process for generating a report from the collected search activity data.

FIG. 8 is a flowchart that generally illustrates a process for generating a report from the search activity data stored in the data store 122. The data can be collected by a variety of techniques, including, but not limited to, the techniques described earlier in connection with FIGS. 1C and 3A to 3E. The illustrated process may be embodied collectively in the report generator 128 and analysis component 126 in FIG. 1B. The process begins by selecting 802 a particular destination web page or web site for analysis. For example, an analyst may desire to know which search queries are used the most frequently to locate and access a particular destination page or site—either via a particular search engine or across all search engines for which search activities are tracked. The selected web page or site can be used as a key in retrieving appropriate search event records from the data store 122. The retrieve event records may be limited to a particular time period, such as the last day or month.

In the illustrated process, the retrieved search event records are then organized 804 or sorted according to search queries used and at least one other criteria, such as time, geographical location, search engine used, and the like. Returning now to the initial example of organization by search engine (FIG. 2, discussed above), the search queries for Google™ are kept separate from the search queries for Yahoo!®, and so on. By organizing or sorting the data, occurrence counts can be determined, e.g., for particular search engine/search query pairs. In addition, data regarding the position or rank (e.g. search results page number) of the particular destination can be generated for each search engine/search query pair.

The sorted data, including the associated statistics (occurrence counts, position data, etc.), is then incorporated in to a report (block 806). The report can be in machine readable form, in human readable form, or both. In one embodiment, the report is generated as a browser-readable report for convenient retrieval by or delivery to a web site operator or other user. The report can further include restriction of data to selected date ranges or other time ranges, analysis or restriction of data to geographical regions, such as countries, territories, states, cities, districts, zip codes, approximate rankings (to the search results page level) for the search result selected, types of industries searched, and the like. For example, the operator of a web site can specify the type of industry to be associated with the web site or with pages of the web site. For example, a particular web site operator can specify that the web site is for legal services. Another web site operator can specify that the web site is for auto repair. This information can be used in report generation for further selection or narrowing of data. For example, in one embodiment, the process generates a report that is similar to that of FIG. 2, but with the data broken down by geographic region rather than by search engine.

The reports can be generated on an on-demand basis, automatically on a regular basis, and the like. For example, the report generator 128 may include a web based interface through which an operator can specify various report-generation parameters, and then initiate the generation of a report Various examples of the reports that can be generated by the report generator are described following the description of the process of FIG. 8.

The reports can be used in a variety of ways. For example, a web site operator can use the reports to improve, measure changes and improvements to the rankings of its web pages in one or more search engines. For instance, a particular web page can be modified, either automatically or manually, to produce higher search engine result rankings. The modification may, for example, include the addition of particular search strings (e.g., those used to find the page but which are not actually present on the page) to the visible or non-visible content of the page, modification of META tags, title attributes, image ALT tags, file naming structure, internal linking structure, and/or other variable on a web page which may affect various search engine algorithms.

In another example, the data can be parsed to determine how geographically diverse users search for similar web pages, such as, how people in New York search for a restaurant versus people in Chicago. In another example, the reports are used to compare how various search engine algorithms are indexing the pages of a web site.

Figures 1, 9A:
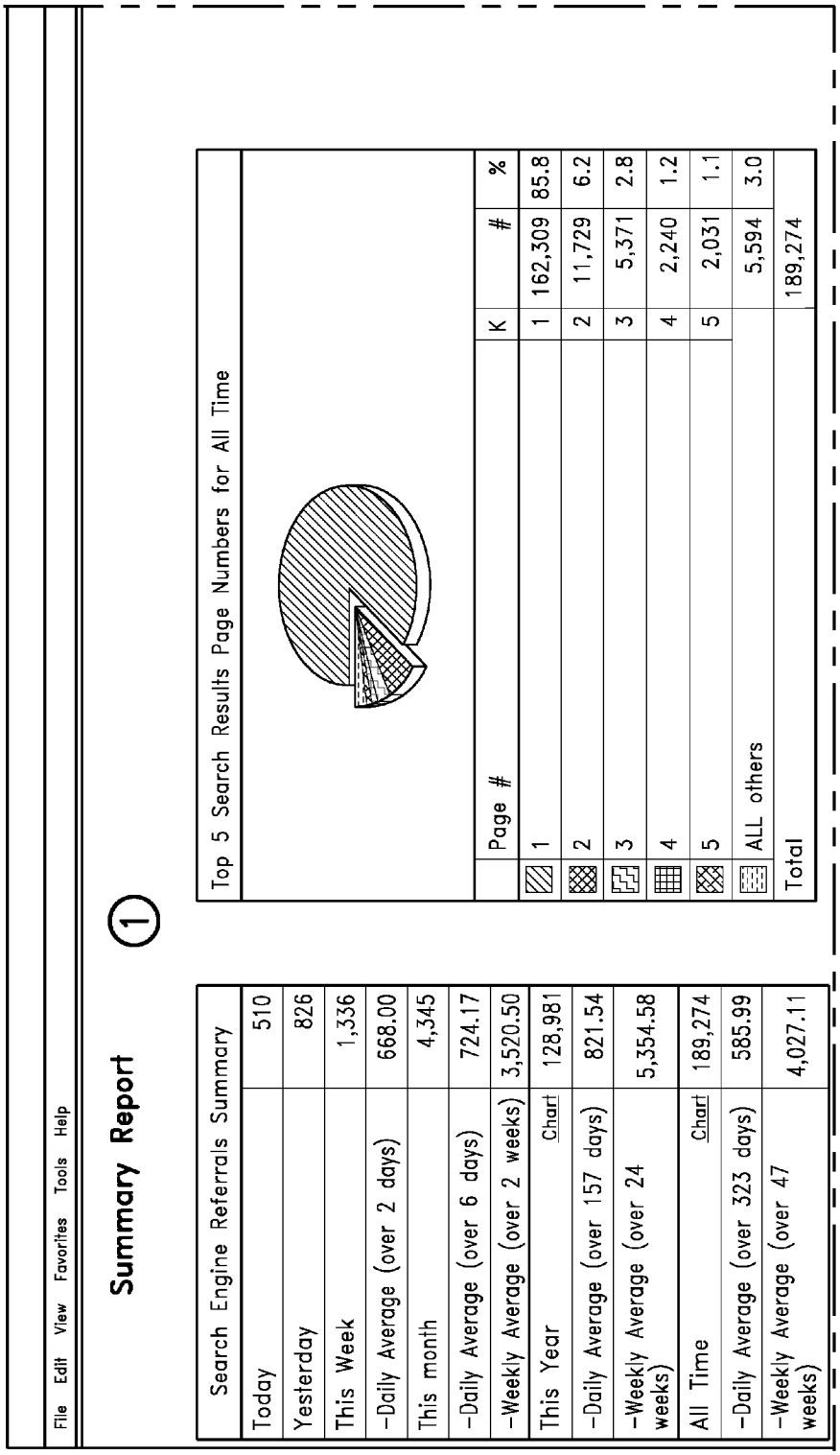
Figures 2, 9A:
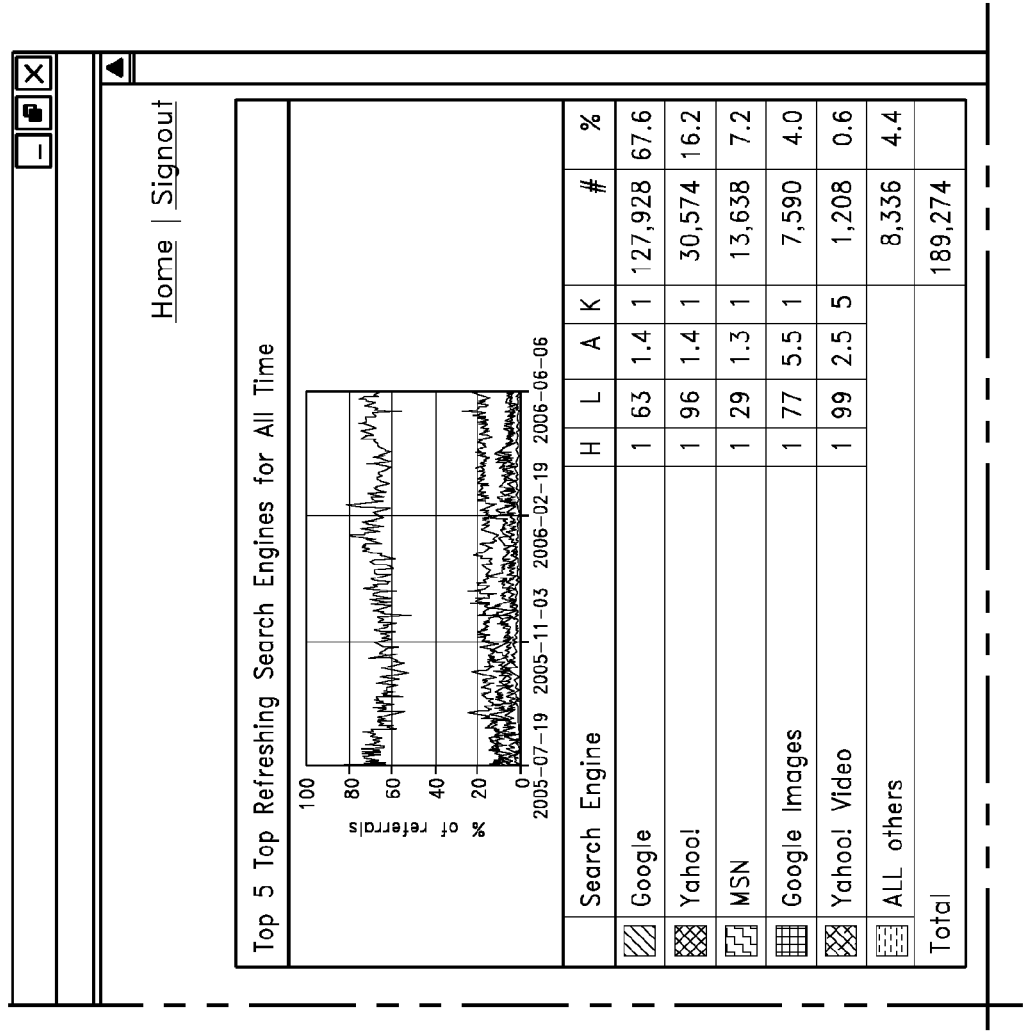
Figures 3, 9A:
Figures 4, 9A:
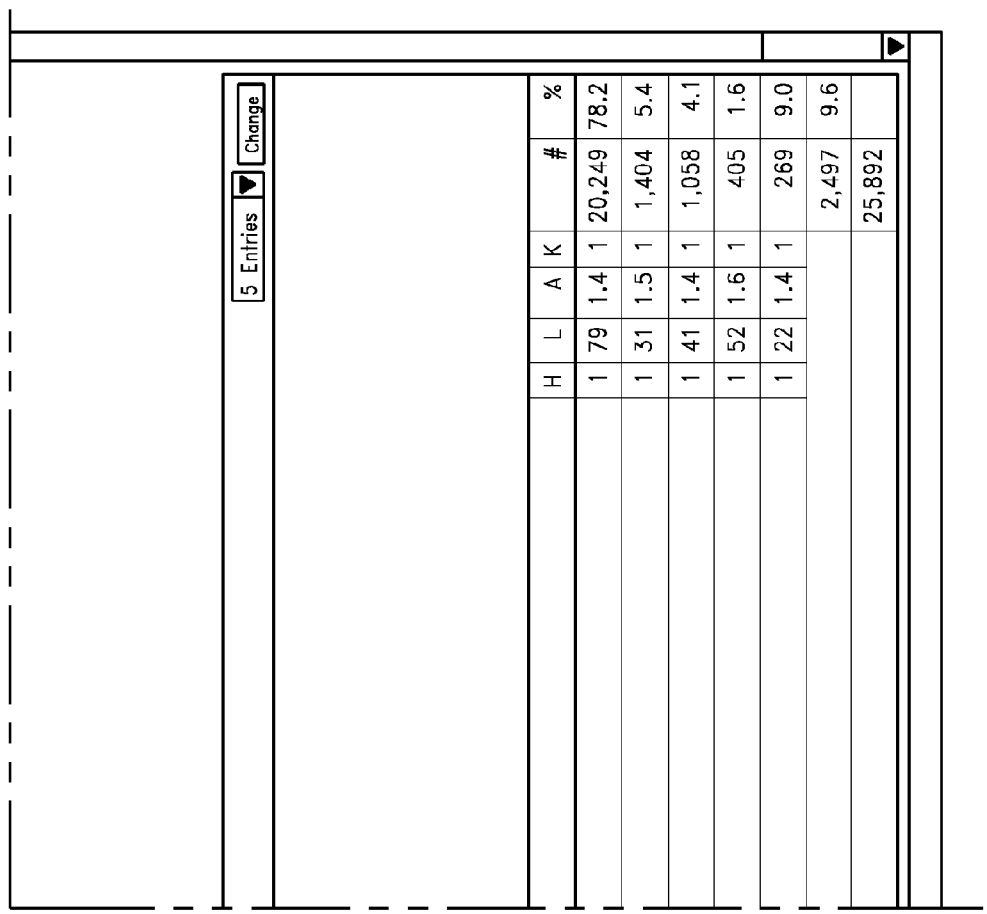

FIGS. 9A to 9G illustrate screenshots showing how an analyst can "drill down" in an interactive report. The numbered circles indicate the drill down level. FIG. 9A illustrates a top-level summary report without drilling down. In addition, FIG. 9A illustrates trend analysis over time. The top right illustrates a graph showing search engine referrals over time, which permits an analyst to observe the relative changes in referrals from search engines over time. These time-based analyses can also be used with, for example, search queries. This permits an analyst to observe if the search queries are changing over time or are changing for a particular search engine. In another example, page position rankings by search engine can be tracked over time, which efficiently permits an analyst to analyze how the relative search rankings change over time, and take corrective actions for specific search engines as necessary.

Figure 9B:
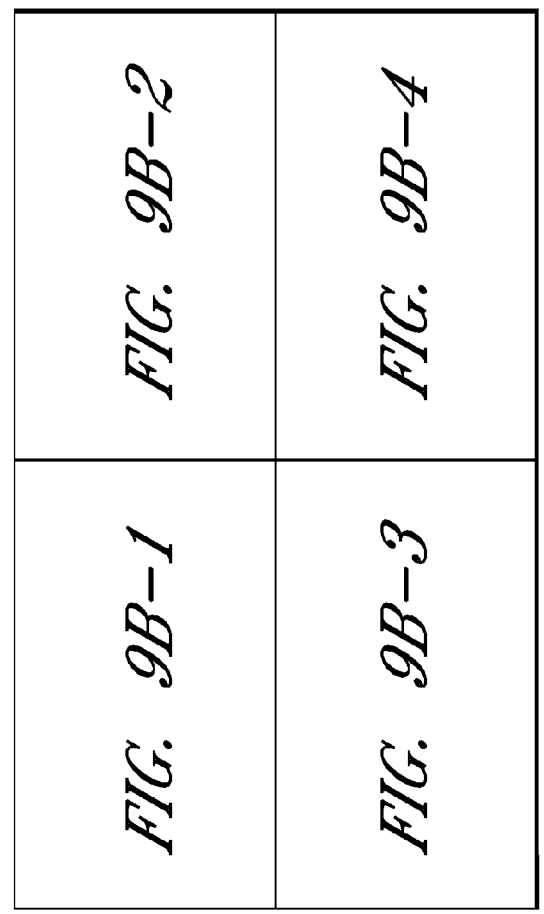
Figures 2, 9B:
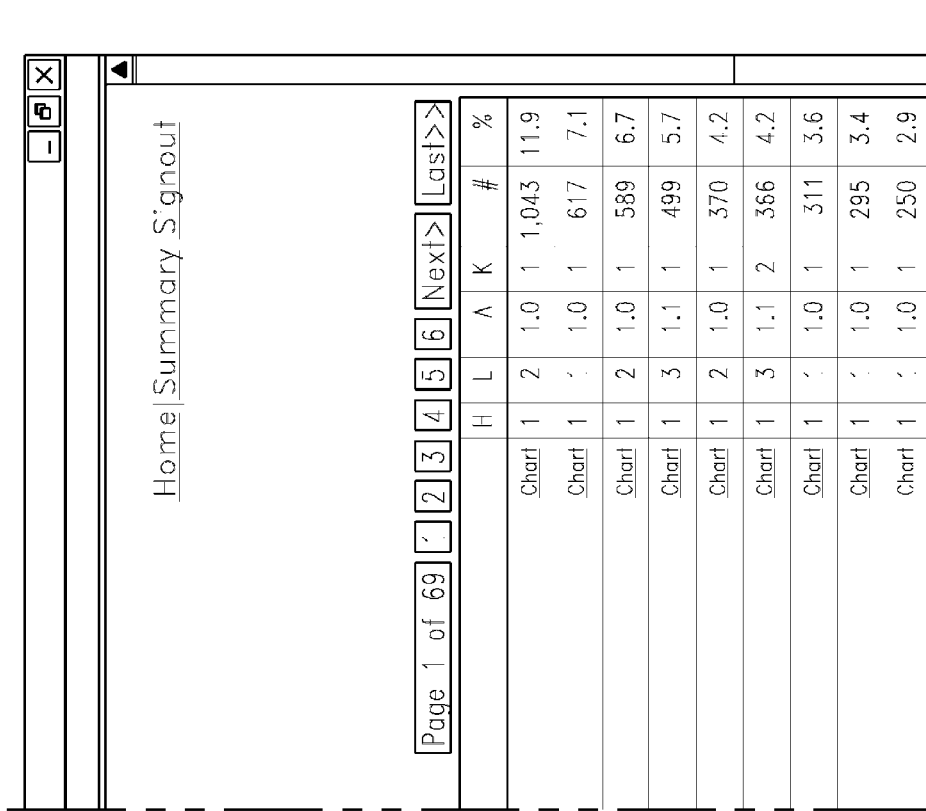
Figures 2, 9C:
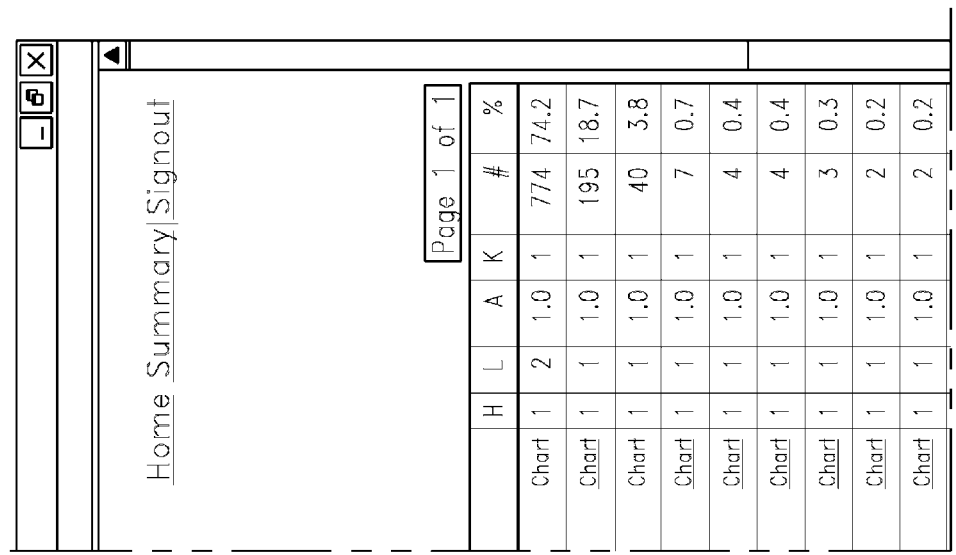
Figures 4, 9C:
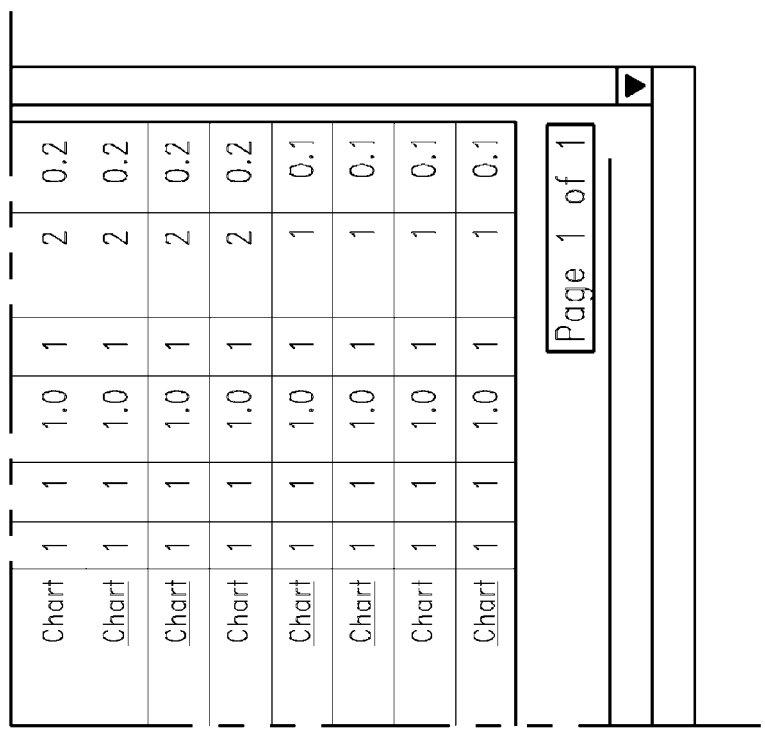
Figures 2, 9D:
Figures 4, 9D:
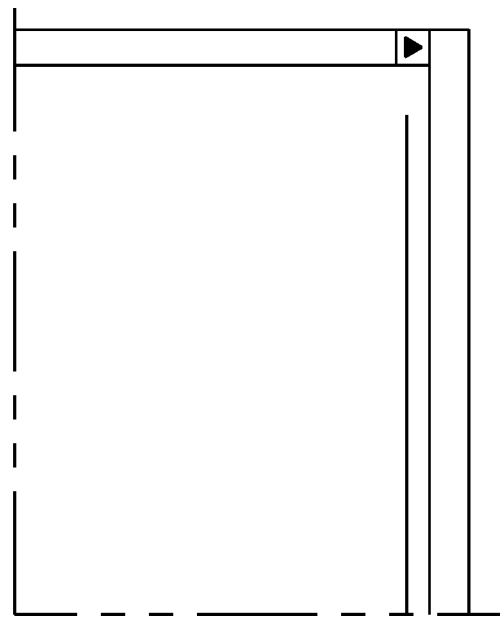
Figures 2, 9G:
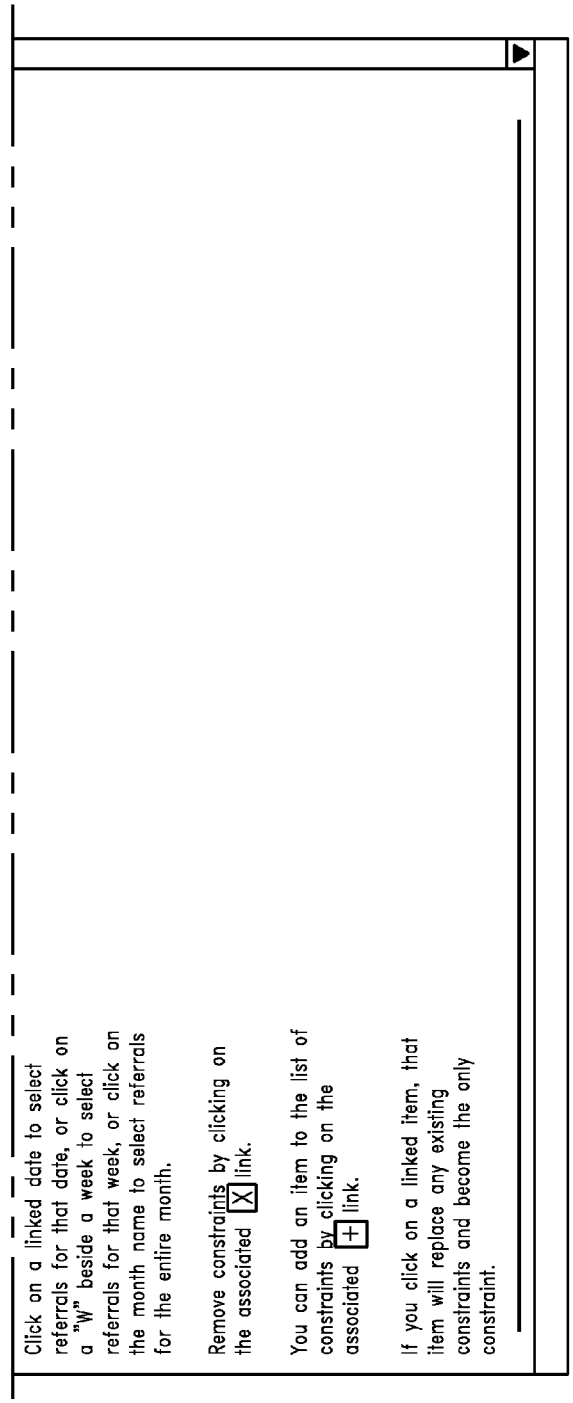

FIG. 9B illustrates a report after the analyst has further selected or "drilled down" to select only the U.S. as the geographical region. The most popular search queries used to find a referred-to web page in the U.S. are displayed. The search queries are listed under "Phrases." FIG. 9C illustrates further selection or "drilled down" the specific search query of "oracle layoffs." FIG. 9D illustrates a further selection to the pages referred by the Google search engine. FIG. 9E illustrates further selection to a particular page, and the display illustrates ordering by region (state, in this example). FIG. 9F illustrates further selection of the selected page to the region of California, and illustrates the ranking by city. FIG. 9G illustrates further selection to "Redwood City," and illustrates the popularity of the web page for the zip codes associated with Redwood City. In addition, the constraint parameters used to further select data for the drill down displays of FIGS. 9B to 9G are illustrated towards the upper left of the displays next to a box with an "X." It should be noted that other constraints previously applied are not shown.

Figure 10A:
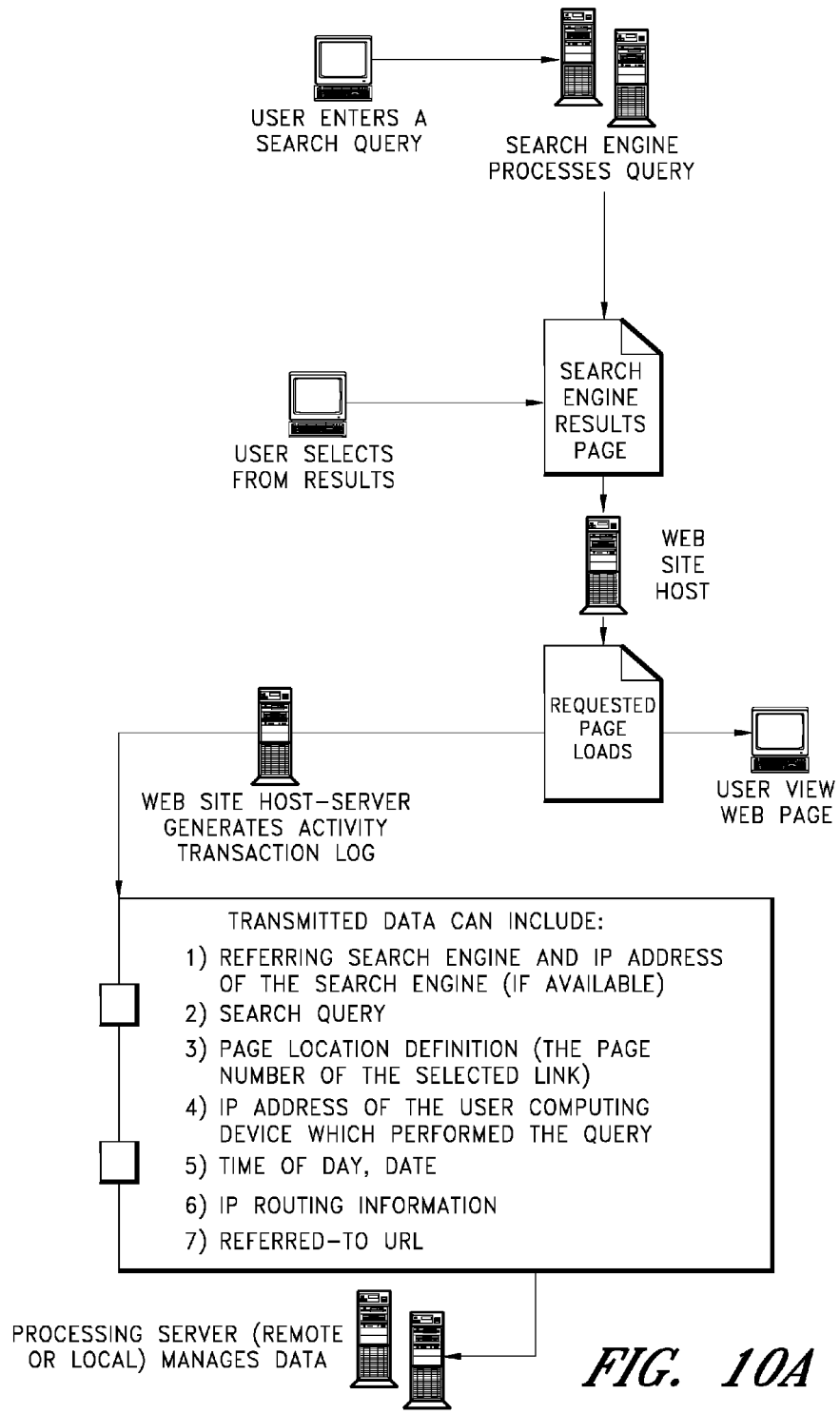
FIGS. 10A-10K are further examples of data flow diagrams.

FIG. 10A illustrates a data flow for generating a log file or web server access log. When the log file contains tracking information, such as IP addresses, HTTP referer URLs, and the like, the analyses and report generation techniques can be applied.

Figure 10B:
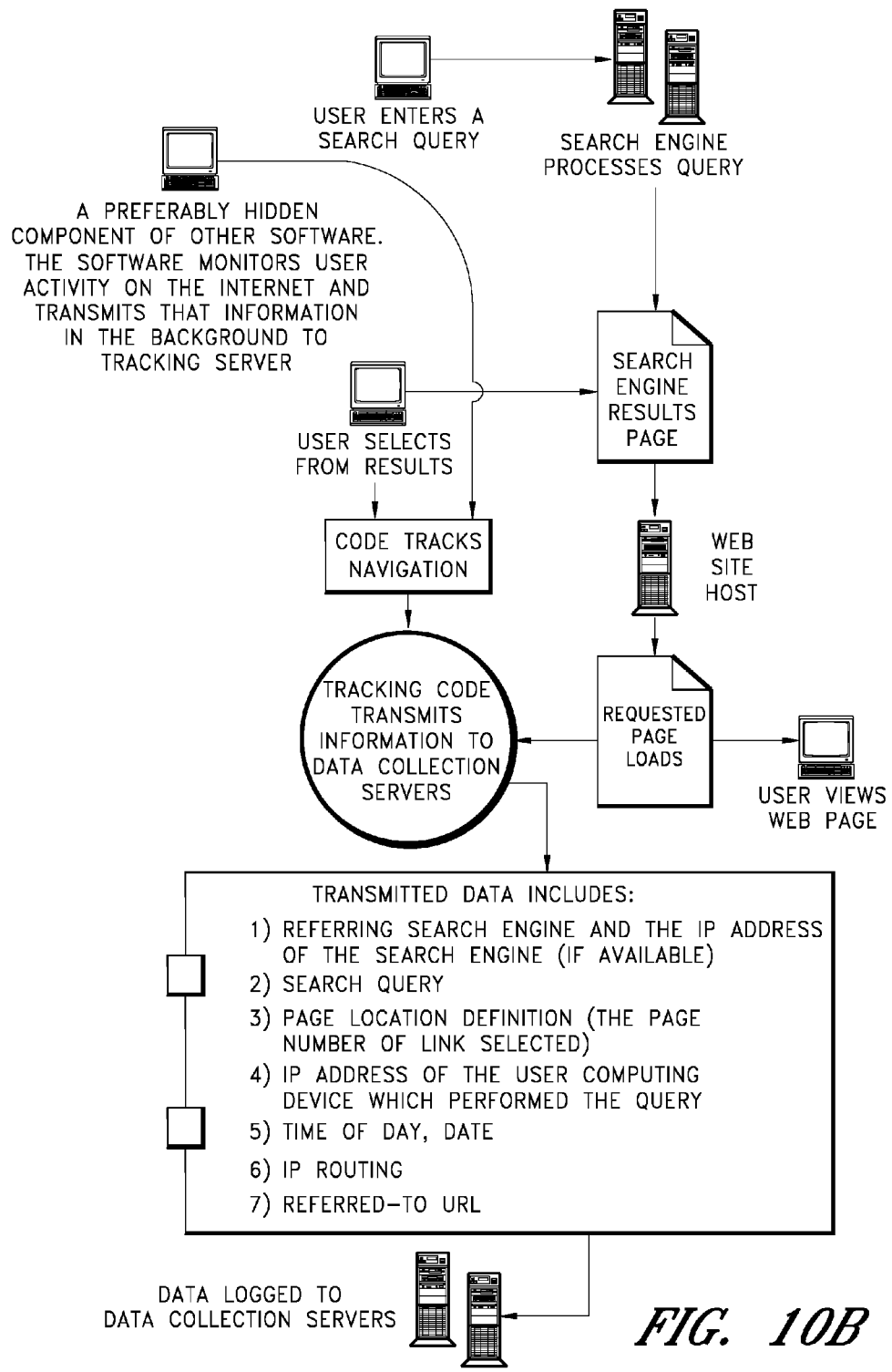

FIG. 10B illustrates a data flow for data tracking using an installed software component. Preferably, the operation of the software component is transparent to the user.

Figure 10C:
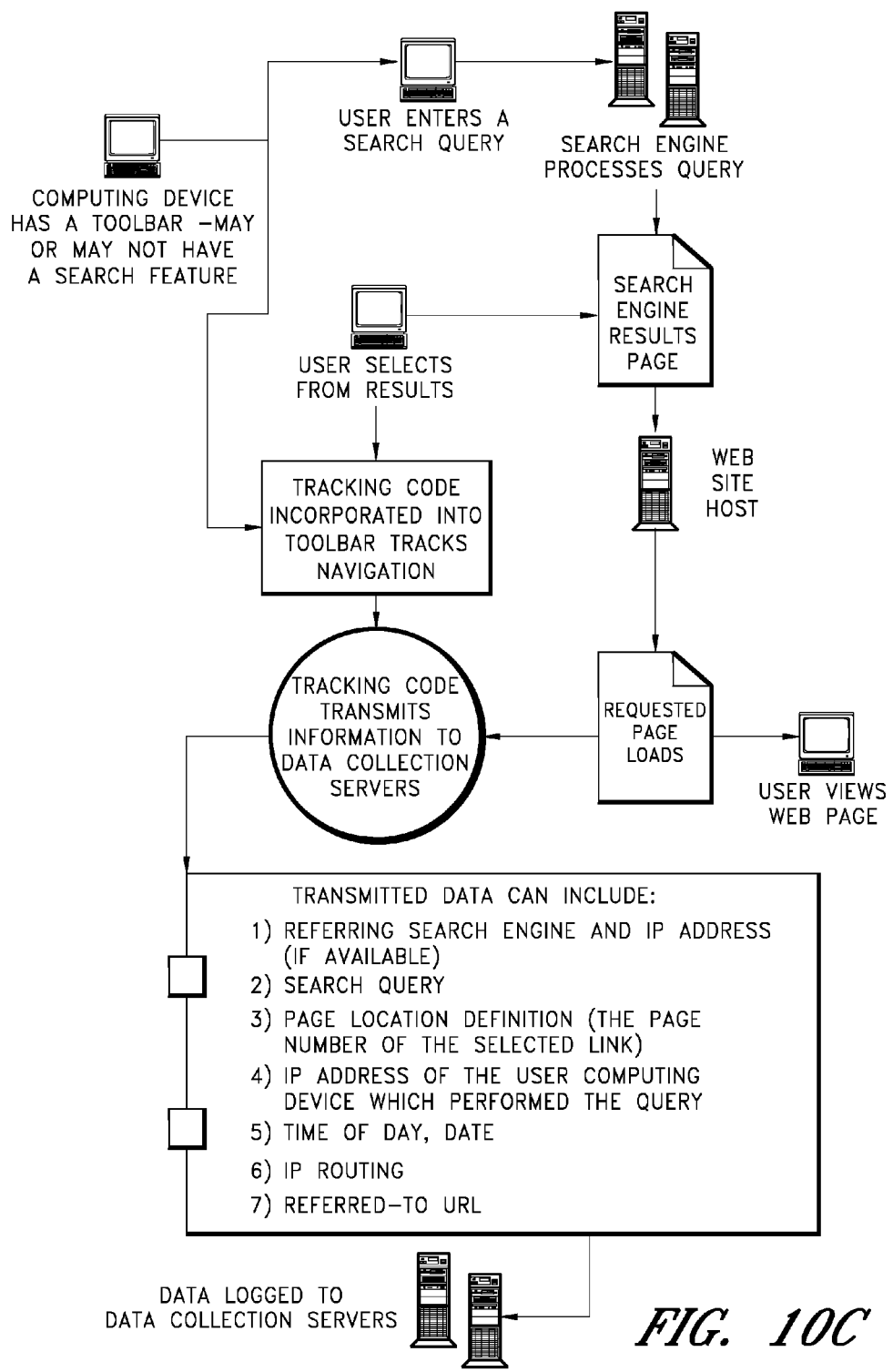

FIG. 10C illustrates a data flow for data tracking using software embedded in a toolbar for a browser.

Figure 10D:
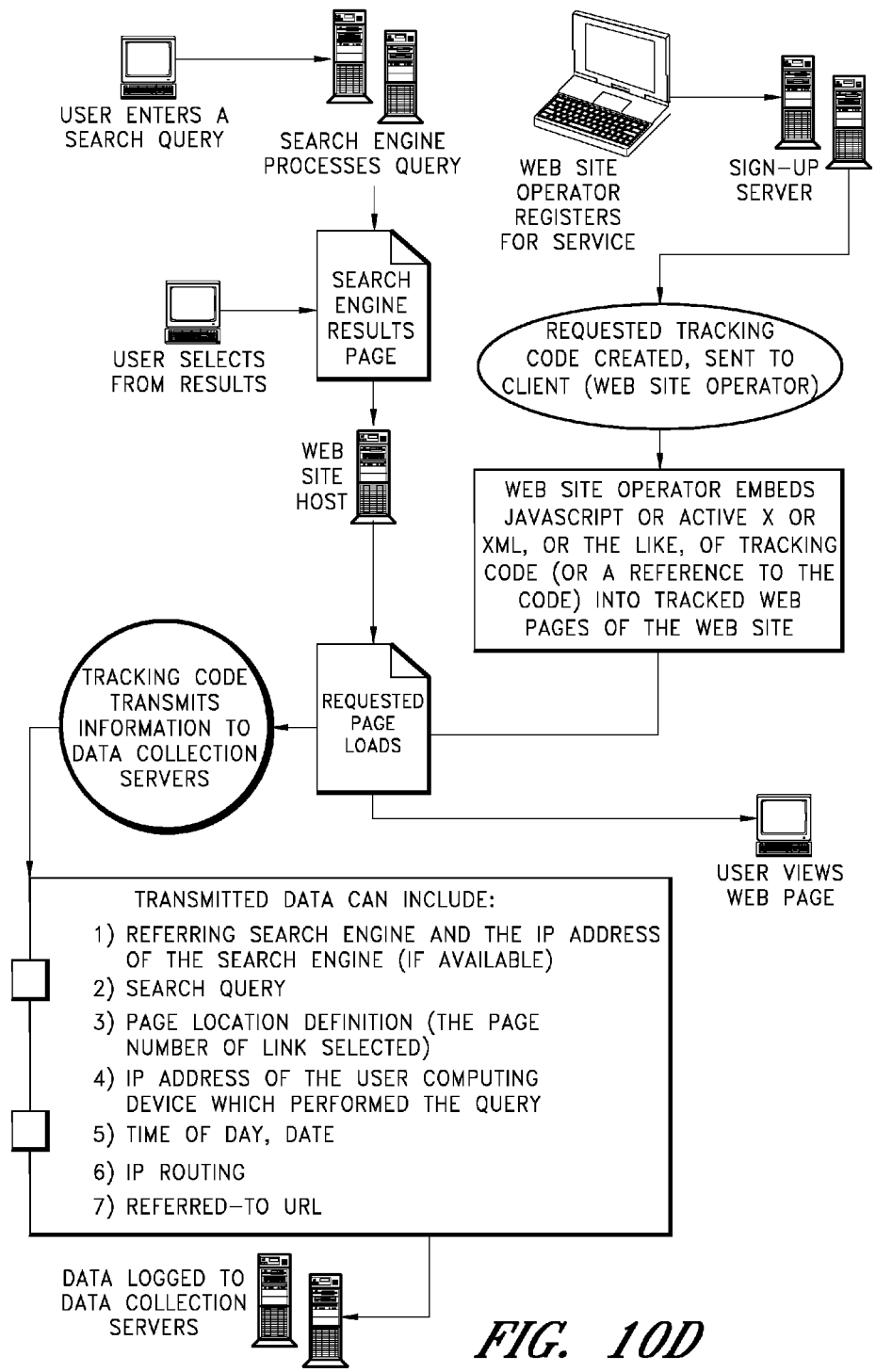

FIG. 10D illustrates a data flow for data tracking using an active, browser-executable component 148. Applicable languages include JavaScript, Active X, XML, and the like.

Figure 10E:
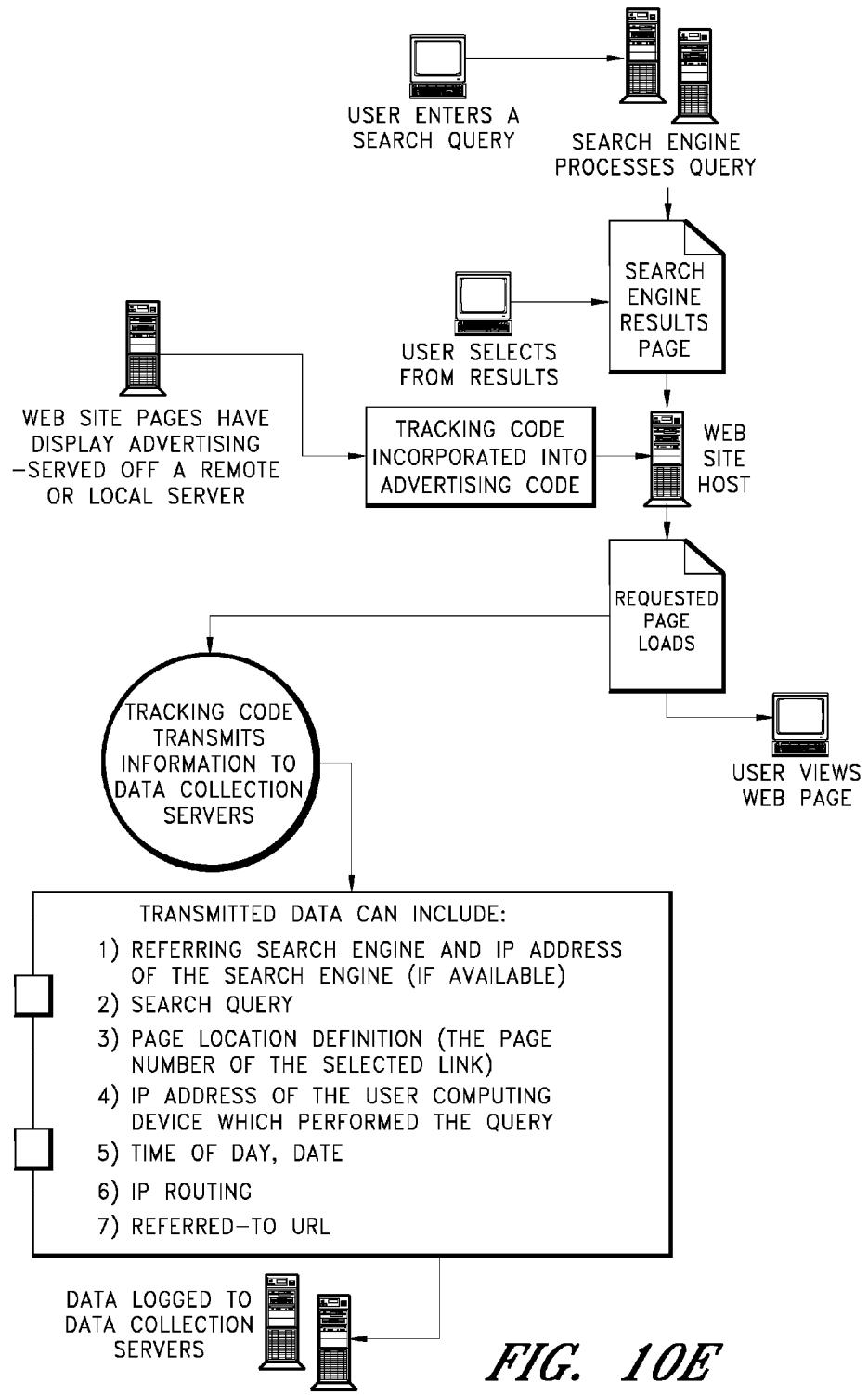

FIG. 10E illustrates a data flow for data tracking using a browser-executable component 148 incorporated into advertising code. In the illustrated example, the browser-executable component 148 provides the tracking information to a data collection server 302.

Figure 10F:
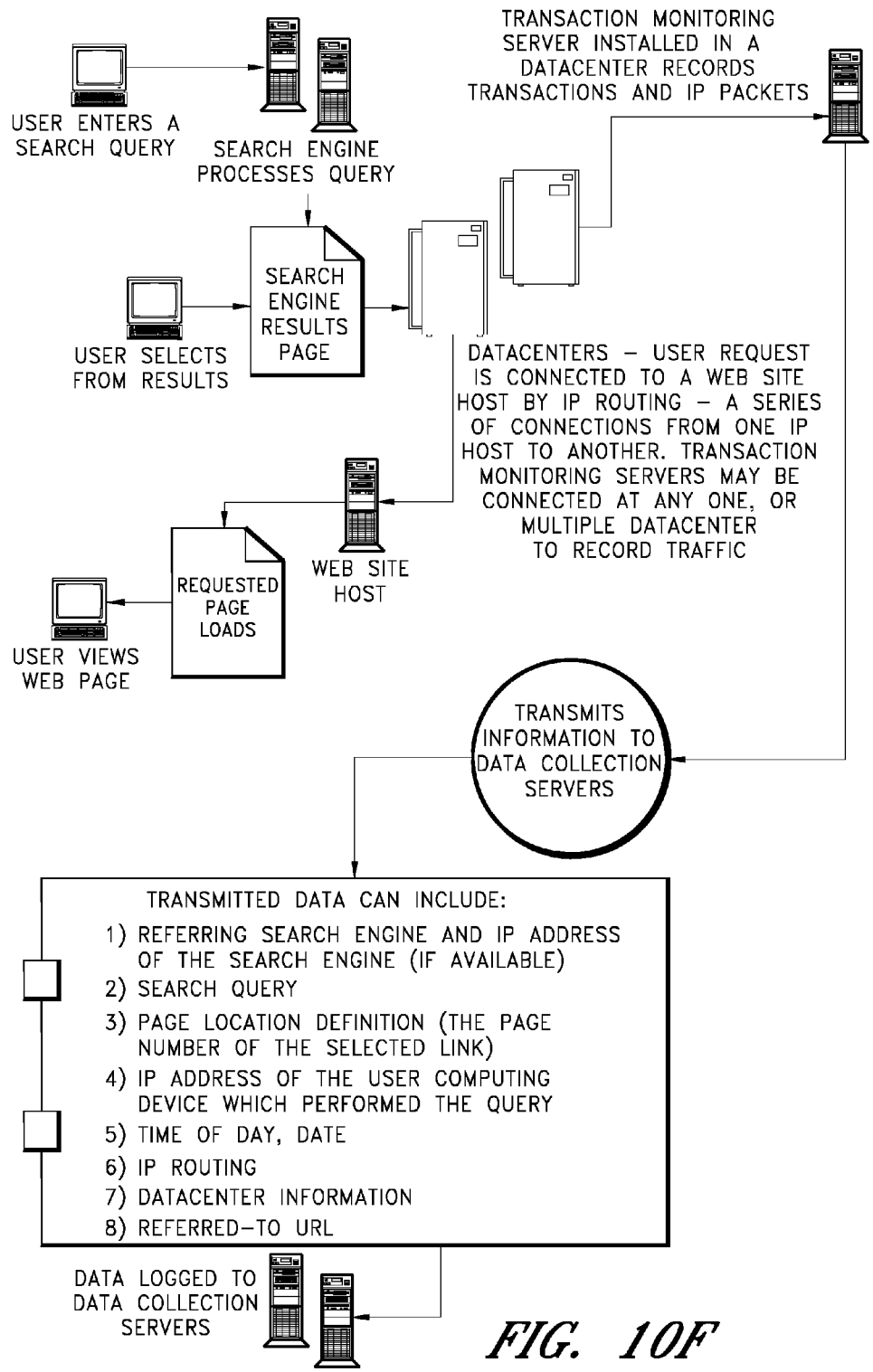

FIG. 10F illustrates a data flow for data tracking using nodes on a network. The nodes can also monitor routing information from one node to another (the previous node and the subsequent node). If sufficient coverage of nodes exists, then the routing of a packet of data can be reconstructed. In one embodiment, IP packets are collected and analyzed for search engine, search query, and referred-to web page information, and the IP packets as a whole are discarded.

Figure 10G:
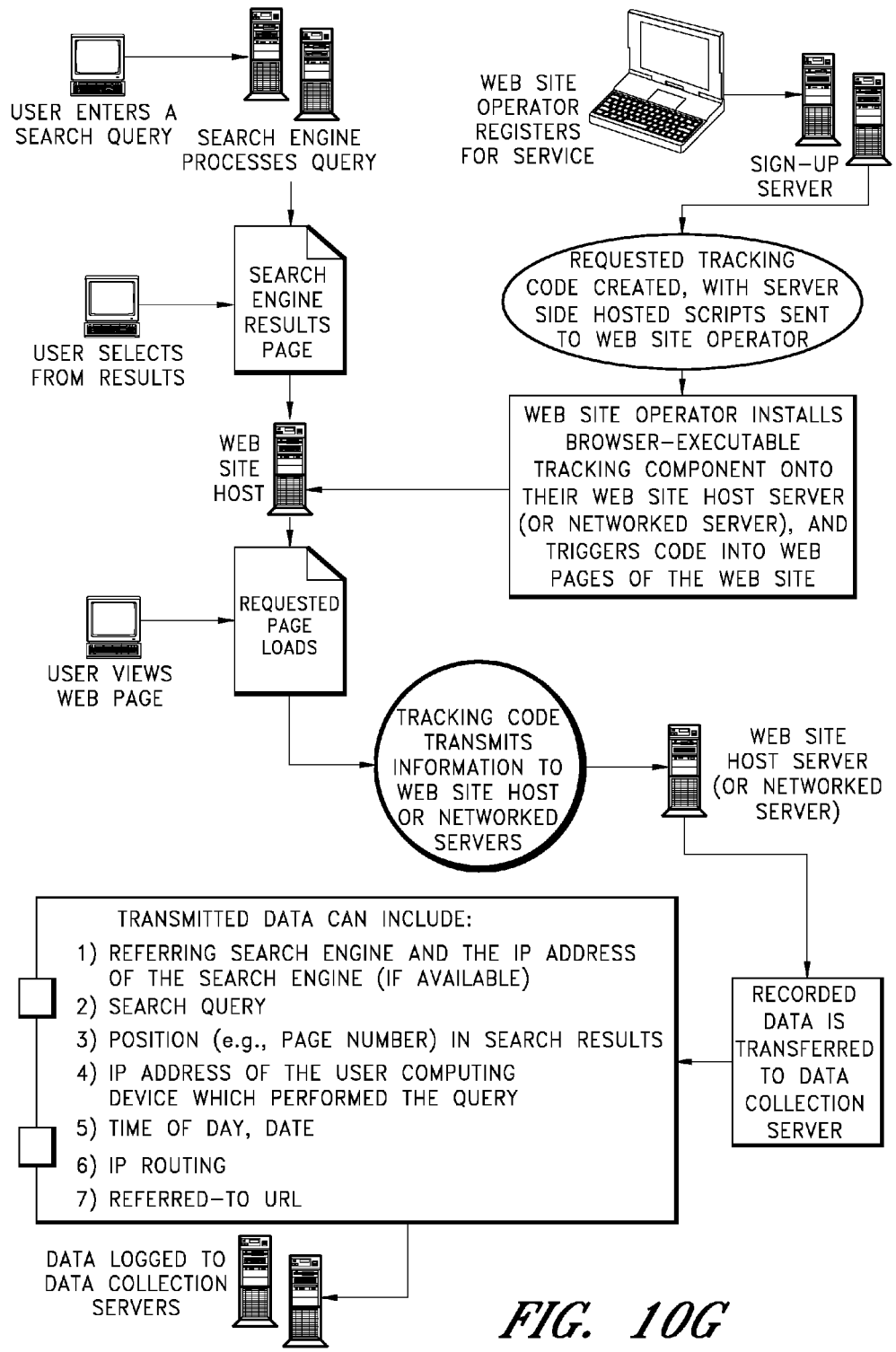

FIG. 10G illustrates a data flow for data tracking using a server-side script. For example, tracking information can be collected by the web site 140, and then transferred to another site for analysis and/or report generation. This site can be, for example, a tracking system 120 with or without the data collection server 302.

Figure 10H:
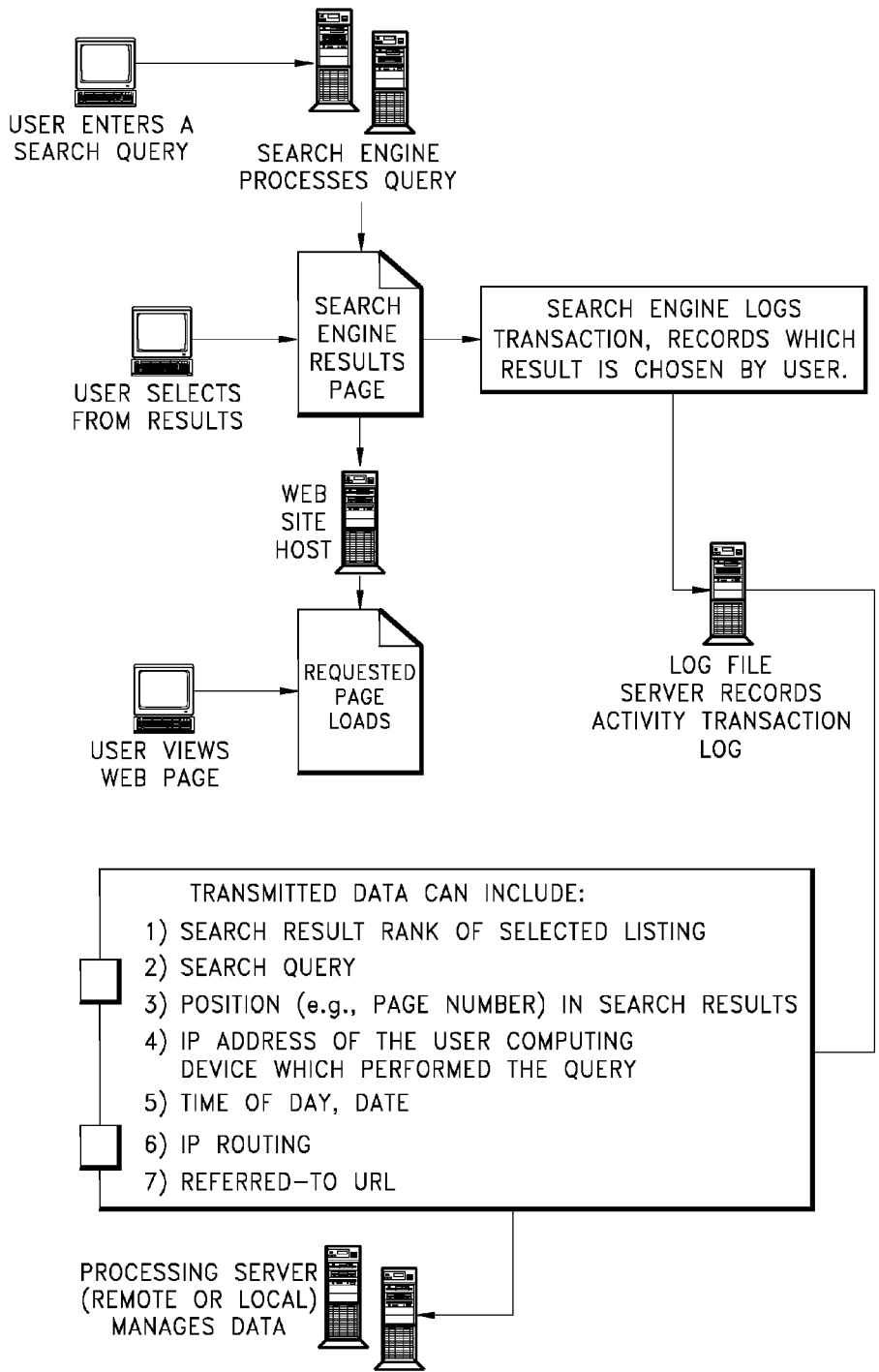

FIG. 10H illustrates a data flow for data tracking using search engine transaction logs as a source of data.

Figure 10I:
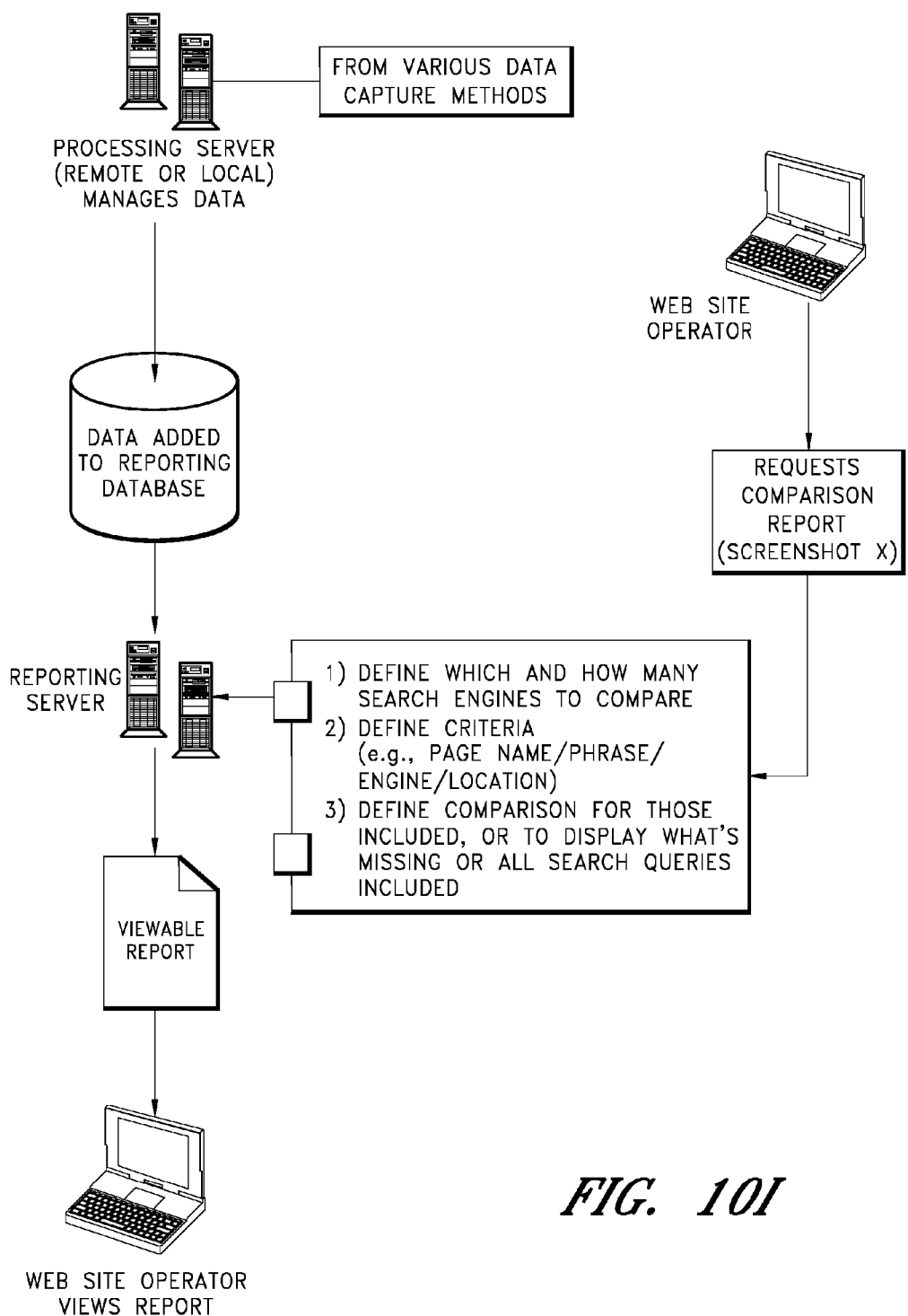

FIG. 10I illustrates a data flow for search engine comparison, a report is generated that compares search queries and the like from various search engines. The reports illustrated in FIGS. 2 and 9A-9G are examples of this type of report.

Figures 2, 10J:
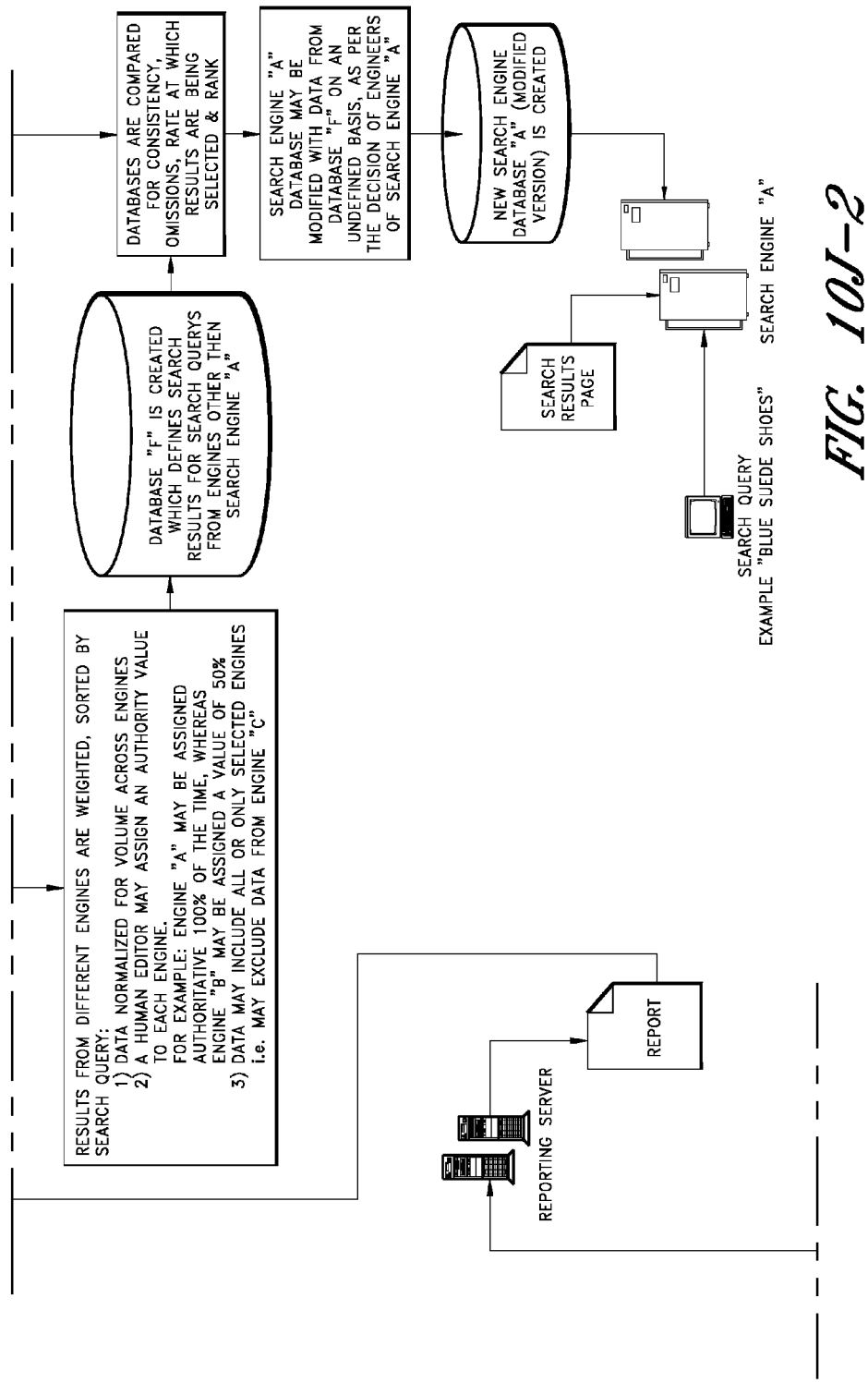
Figures 3, 10J:
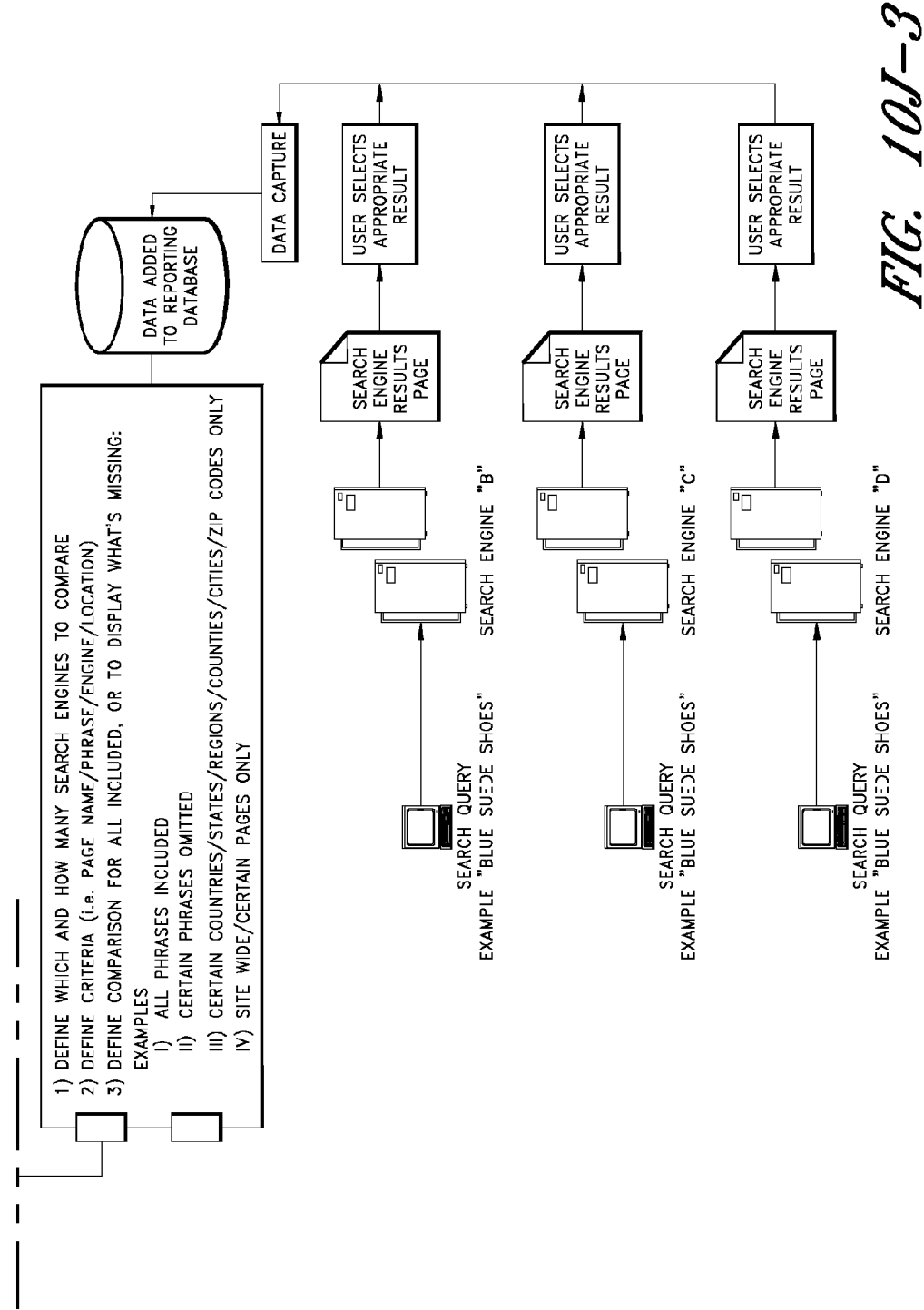
Figure 10K:
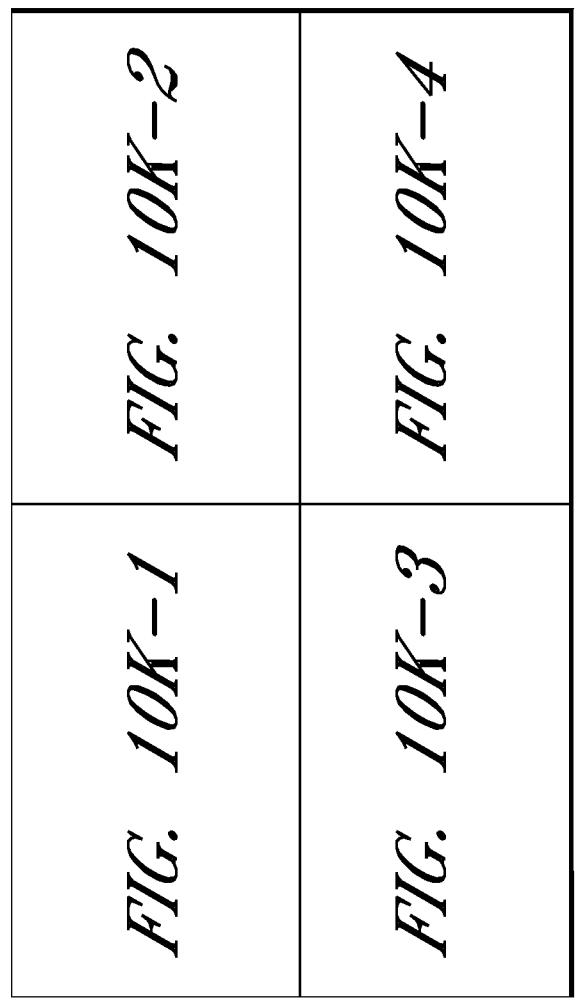
Figures 3, 10K:
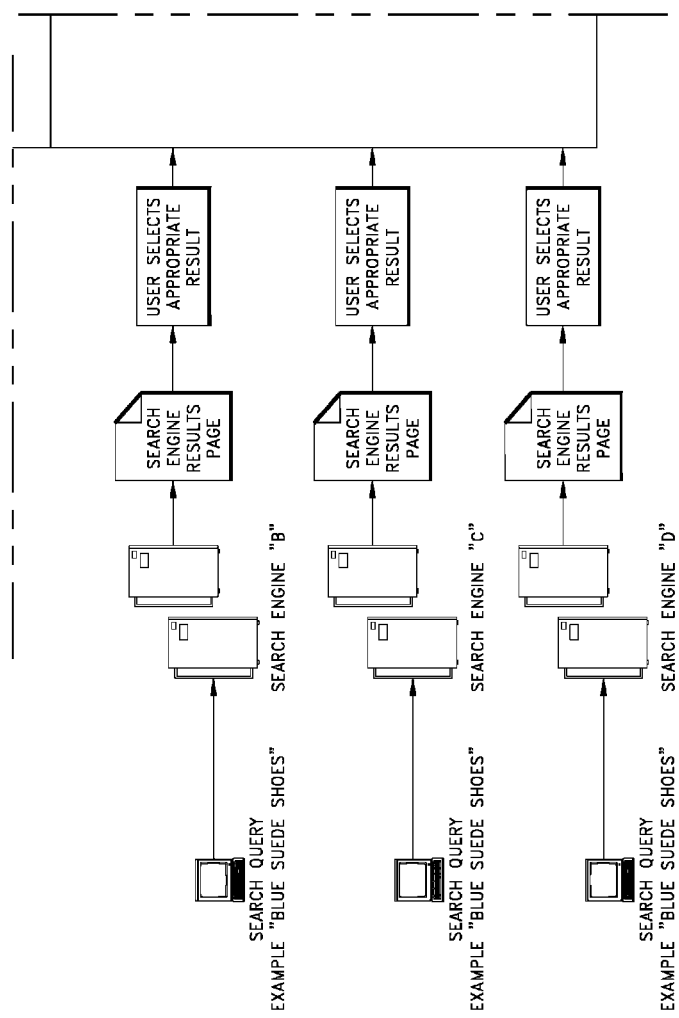
Figures 4, 10K:
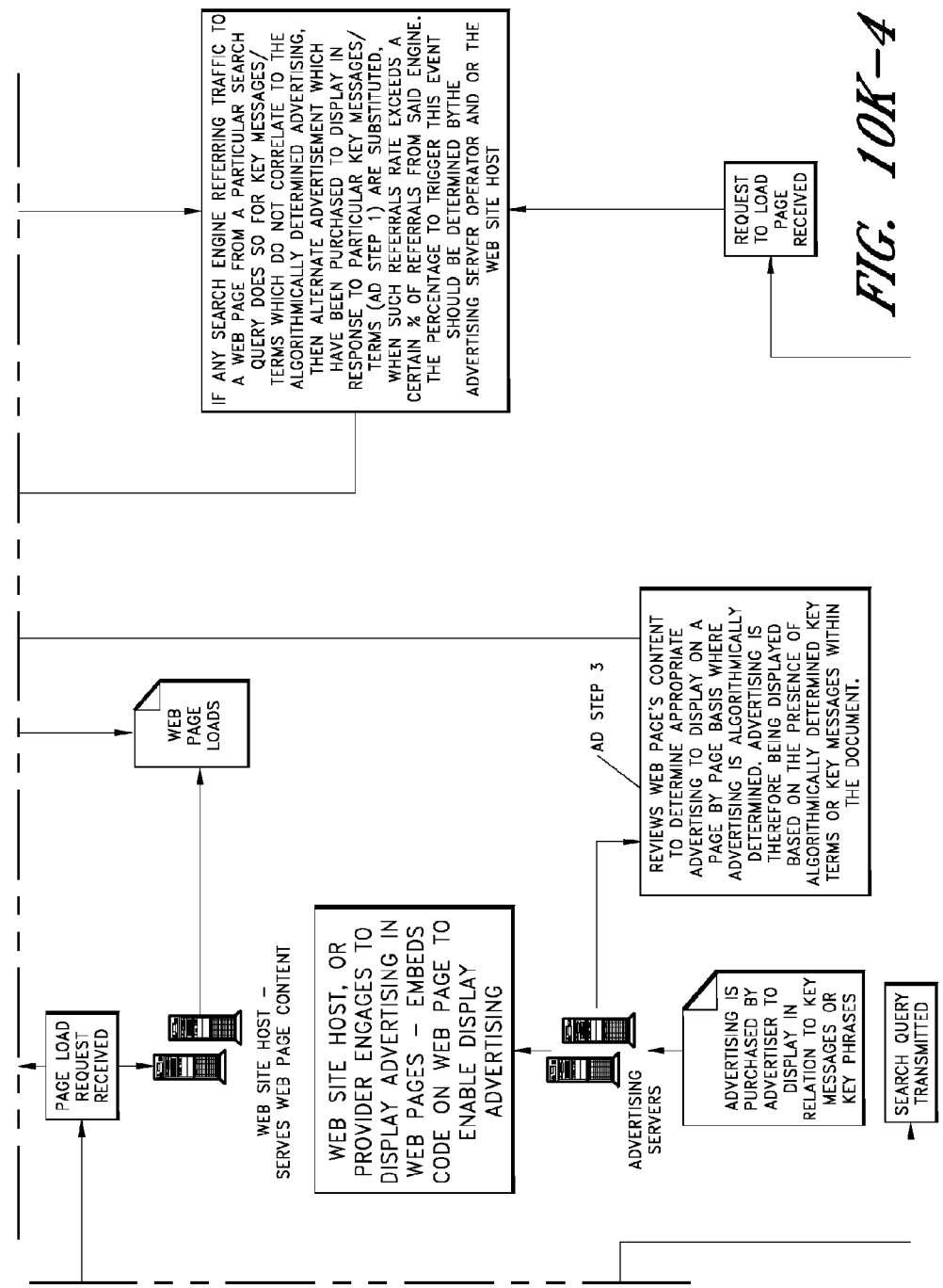

FIG. 10J illustrates a data flow of an example of search engine database updating. In the illustrated example, a database for Search Engine A is modified using search information (database E) obtained from tracking of Search Engines B, C, and D. Database F is derived from database E. Normalization and weighting techniques can be used. Database F is used to modify database A for Search Engine A.

FIG. 10K illustrates a data flow for updating a database used for selecting advertisements based on historical search queries used to select the web page and/or web pages for which advertisements will be used.

The various processes described above may embodied in, and fully automated by, software modules executed by general-purpose computers. These modules may be stored on any type of computer-readable medium or computer storage device. In addition, It will be appreciated by the skilled practitioner that the illustrated processes can be modified in a variety of ways without departing from the spirit and scope of the invention. For example, in another embodiment, various portions of the illustrated processes can be combined, can be rearranged in an alternate sequence, can be removed, and the like.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A computer-implemented method, comprising:
tracking search activities of search engine users over a plurality of index-type search engines to generate search activity data, said search activity data identifying at least search queries submitted by search engine users to locate and access a particular destination, wherein each of the search engine users interacts with a search results page of the index-type search engine to view search results, and wherein each of the plurality of search engines maintains its own proprietary index obtained by crawling web sites for building a unique database for generating search results;
programmatically analyzing search activity data to generate statistical data regarding said search queries used to locate and access the particular destination, said statistical data encompassing search activities over the plurality of index-type search engines, wherein said programmatically analyzing is performed by a computer system having a processor and memory; and
automatically incorporating the statistical data into a search result ranking process of a particular index-type search engine such that a search result ranking assigned by the particular index-type search engine to the particular destination is dependent upon searches conducted via at least one other index-type search engine.

2. The method of claim 1, wherein the particular destination is a particular web page.

3. The method of claim 2, wherein tracking the search activities of search engine users comprises using a browser-executable component included in the particular web page to track the search queries submitted by search engine users to locate and access the particular web page.

4. The method of claim 1, wherein the particular destination is a particular file.

5. The method of claim 1, wherein the statistical data includes, for particular index-type search engines and search queries, data regarding positions at which the particular destination appeared in search results listings.

6. The method of claim 5, wherein the positions are specified in terms of search results page numbers.

7. The method of claim 1, wherein programmatically analyzing search activity data further comprises normalizing the search activity data for variations in traffic among the index-type search engines.

8. The method of claim 7, wherein programmatically analyzing search activity data further comprises unequally weighting the normalized comparisons of search engine data.

9. The method of claim 8, wherein the search activity data from the particular search engine is given substantially zero weight.

10. The method of claim 1, further comprising generating and merging the statistical data with a database of the particular search engine.

11. A computer system, comprising:
a data collection server including computer hardware configured to track search activities of search engine users over a plurality of index-type search engines to generate search activity data, said search activity data identifying at least search queries submitted by search engine users to locate and access a particular destination, wherein each of the search engine users interacts with a search results page of the index-type search engine to view search results, and wherein each of the plurality of search engines maintains its own proprietary index obtained by crawling web sites for building a unique database for generating search results; and
an analyzer configured to analyze search activity data to generate statistical data regarding said search queries used to locate and access the particular destination, said statistical data encompassing search activities over the plurality of index-type search engines, said analyzer further configured to automatically incorporate the statistical data into a search result ranking process of a particular index-type search engine such that a search result ranking assigned by the particular index-type search engine to the particular destination is dependent upon searches conducted via at least one other index-type search engine.

12. The computer system of claim 11, wherein the particular destination is a particular web page.

13. The computer system of claim 12, wherein the data collection server is configured to communicate with a browser-executable component included in the particular web page to track the search queries submitted by search engine users to locate and access the particular web page.

14. The computer system of claim 11, wherein the particular destination is a particular file.

15. The computer system of claim 11, wherein the statistical data includes, for particular index-type search engines and search queries, data regarding positions at which the destination appeared in search results listings.

16. The computer system of claim 15, wherein the positions are specified in terms of search results page numbers.

17. The computer system of claim 11, wherein the analyzer further normalizes the search activity data for variations in traffic among the index-type search engines.

18. The computer system of claim 17, wherein the analyzer further unequally weights normalized comparisons of search engine data.

19. The computer system of claim 18, wherein the search activity data from the particular search engine is given substantially zero weight.

20. The computer system of claim 11, wherein the analyzer is further configured to merge the statistical data with a database of the particular search engine.

* * * * *